(12) United States Patent
Mostov

(10) Patent No.: US 7,990,270 B2
(45) Date of Patent: Aug. 2, 2011

(54) TRANSPORTATION SECURITY SYSTEM AND ASSOCIATED METHODS

(75) Inventor: Kirill Mostov, Berkeley, CA (US)

(73) Assignee: Kirsen Technologies Corporation Inc., Berkeley, CA (US)

( * ) Notice: Subject to any disclaimer, the term of this patent is extended or adjusted under 35 U.S.C. 154(b) by 1118 days.

(21) Appl. No.: 11/343,560

(22) Filed: Jan. 30, 2006

(65) Prior Publication Data

US 2006/0181413 A1      Aug. 17, 2006

Related U.S. Application Data

(60) Provisional application No. 60/648,260, filed on Jan. 28, 2005.

(51) Int. Cl.
*G08B 13/14* (2006.01)
(52) U.S. Cl. .................... 340/572.1; 340/500; 340/540; 340/568.1; 340/541; 340/539.13
(58) Field of Classification Search ................ 340/572.1
See application file for complete search history.

(56) References Cited

U.S. PATENT DOCUMENTS

| | | | |
|---|---|---|---|
| 3,889,627 A * | 6/1975 | Cloyd | ........................... 116/215 |
| 4,792,796 A | 12/1988 | Bradshaw et al. | |
| 4,821,291 A | 4/1989 | Stevens et al. | |
| 4,879,756 A | 11/1989 | Stevens et al. | |
| 4,926,868 A | 5/1990 | Larsen | |
| 4,937,586 A | 6/1990 | Stevens et al. | |
| 4,992,656 A * | 2/1991 | Clauser | ......................... 250/251 |
| 5,177,432 A | 1/1993 | Waterhouse et al. | |
| 5,245,534 A | 9/1993 | Waterhouse et al. | |
| 5,374,815 A | 12/1994 | Waterhouse et al. | |

(Continued)

FOREIGN PATENT DOCUMENTS

WO  PCT/US2007/86664      7/2008

(Continued)

OTHER PUBLICATIONS

U.S. Appl. No. 11/1951,915; Office Action mailed Feb. 26, 2009.

(Continued)

*Primary Examiner* — Travis Hunnings
(74) *Attorney, Agent, or Firm* — Orrick, Herrington & Sutcliffe LLP

(57) ABSTRACT

A security system for monitoring at least one shipping container being transported by at least one cargo transport vehicle has a Container Security Device (CSD) configured to be removably coupled to the at least one freight shipping container wall thereby utilizing for monitoring a cargo inside the container and detection of intrusion violations accompanied with partial destruction of the container wall when in a coupled condition. The CSD including at least one anti-tamper sensor, a microcontroller and a communication device; where the microcontroller generates an alarm signal based on a signal from at least one anti-tamper sensor is subjected to an individual sensor processing procedure and then to an integrated sensor processing procedure, the integrated sensor processing procedure make determination of the overall container alert status based on the alarm signal from at least one sensor. The system also has a Network Operations Center (NOC), the NOC including a NOC communications facility configured to communicate with at least one telecommunication network, the NOC being configured to receive data from each of the plurality of the CSDs and including a data storage medium configured to store sensor data and contained an archive of the container events.

7 Claims, 25 Drawing Sheets

U.S. PATENT DOCUMENTS

| | | | |
|---|---|---|---|
| 5,406,842 A | 4/1995 | Locke | |
| 5,472,309 A | 12/1995 | Bernard et al. | |
| 5,507,291 A | 4/1996 | Stirbl et al. | |
| 5,531,290 A * | 7/1996 | Furuichi et al. | 180/271 |
| 5,532,465 A | 7/1996 | Waterhouse et al. | |
| 5,533,606 A | 7/1996 | Yuyama | |
| 5,646,616 A | 7/1997 | Komatsu | |
| 5,670,886 A | 9/1997 | Wolff et al. | |
| 5,875,434 A | 2/1999 | Matsuoka et al. | |
| 5,877,962 A | 3/1999 | Redcliffe | |
| 5,905,380 A | 5/1999 | Weiner et al. | |
| 5,943,841 A | 8/1999 | Wunscher | |
| 6,032,127 A | 2/2000 | Schkolnick et al. | |
| 6,208,908 B1 | 3/2001 | Boyd et al. | |
| 6,308,109 B1 | 10/2001 | Yuyama et al. | |
| 6,480,103 B1 * | 11/2002 | McCarthy et al. | 340/425.5 |
| 6,501,390 B1 * | 12/2002 | Chainer et al. | 340/870.16 |
| 6,505,093 B1 | 1/2003 | Thatcher et al. | |
| 6,573,732 B1 | 6/2003 | Reimer | |
| 6,628,992 B2 * | 9/2003 | Osburn, III | 700/9 |
| 6,662,649 B1 * | 12/2003 | Knight et al. | 73/290 V |
| 6,847,892 B2 * | 1/2005 | Zhou et al. | 701/213 |
| 6,879,257 B2 * | 4/2005 | Hisano et al. | 340/568.2 |
| 6,919,803 B2 * | 7/2005 | Breed | 340/539.14 |
| 6,927,728 B2 | 8/2005 | Vook et al. | |
| 7,002,472 B2 * | 2/2006 | Stratmoen et al. | 340/539.26 |
| 7,028,861 B2 | 4/2006 | Sayers et al. | |
| 7,046,015 B2 | 5/2006 | Suginouchi et al. | |
| 7,049,963 B2 | 5/2006 | Waterhouse | |
| 7,088,290 B2 | 8/2006 | Ohno et al. | |
| 7,096,645 B2 | 8/2006 | Zhu et al. | |
| 7,098,784 B2 * | 8/2006 | Easley et al. | 340/539.13 |
| 7,256,694 B2 * | 8/2007 | Papari et al. | 340/565 |
| 7,339,469 B2 * | 3/2008 | Braun | 340/539.13 |
| 2002/0111774 A1 * | 8/2002 | Kauppila | 702/188 |
| 2004/0053641 A1 | 3/2004 | Leung et al. | |
| 2004/0069849 A1 | 4/2004 | Stevens et al. | |
| 2004/0100379 A1 | 5/2004 | Boman et al. | |
| 2004/0113783 A1 * | 6/2004 | Yagesh | 340/568.1 |
| 2004/0149822 A1 | 8/2004 | Stevens et al. | |
| 2004/0201454 A1 | 10/2004 | Waterhouse | |
| 2004/0205350 A1 | 10/2004 | Waterhouse et al. | |
| 2005/0004726 A1 * | 1/2005 | Paquet | 701/36 |
| 2005/0007124 A1 | 1/2005 | Tsuji | |
| 2005/0029149 A1 | 2/2005 | Leung | |
| 2005/0029345 A1 | 2/2005 | Waterhouse et al. | |
| 2005/0043850 A1 | 2/2005 | Stevens et al. | |
| 2005/0083213 A1 | 4/2005 | Stevens et al. | |
| 2005/0086983 A1 | 4/2005 | Stevens et al. | |
| 2005/0104603 A1 | 5/2005 | Peschmann et al. | |
| 2005/0113703 A1 | 5/2005 | Farringdon et al. | |
| 2005/0149226 A1 | 7/2005 | Stevens et al. | |
| 2005/0156780 A1 | 7/2005 | Bonthron et al. | |
| 2005/0205817 A1 | 9/2005 | Marcichow et al. | |
| 2005/0251330 A1 | 11/2005 | Waterhouse et al. | |
| 2006/0124662 A1 | 6/2006 | Reynolds et al. | |
| 2006/0128023 A1 | 6/2006 | Waterhouse et al. | |
| 2006/0164232 A1 | 7/2006 | Waterhouse | |
| 2006/0181413 A1 | 8/2006 | Mostov | |
| 2006/0220857 A1 | 10/2006 | August et al. | |
| 2006/0232417 A1 | 10/2006 | August et al. | |
| 2006/0258896 A1 | 11/2006 | Haber et al. | |
| 2007/0171119 A1 | 7/2007 | Dwelly et al. | |
| 2007/0194976 A1 | 8/2007 | Reed et al. | |
| 2007/0194982 A1 | 8/2007 | Stove | |
| 2007/0205937 A1 | 9/2007 | Thompson et al. | |
| 2008/0211711 A1 | 9/2008 | Mostov et al. | |
| 2010/0027737 A1 | 2/2010 | Mostov | |

FOREIGN PATENT DOCUMENTS

| | | |
|---|---|---|
| WO | PCT/US2008/081200 | 12/2008 |
| WO | PCT/US2008/084240 | 2/2009 |

OTHER PUBLICATIONS

U.S. Appl. No. 11/951,915; Office Action mailed Dec. 7, 2009.
U.S. Appl. No. 12/258,259; Notice of Allowance mailed Feb. 3, 2011.
U.S. Appl. No. 12/258,259; Office Action mailed Sep. 20, 2010.

* cited by examiner

FIG. 2 System Block Diagram

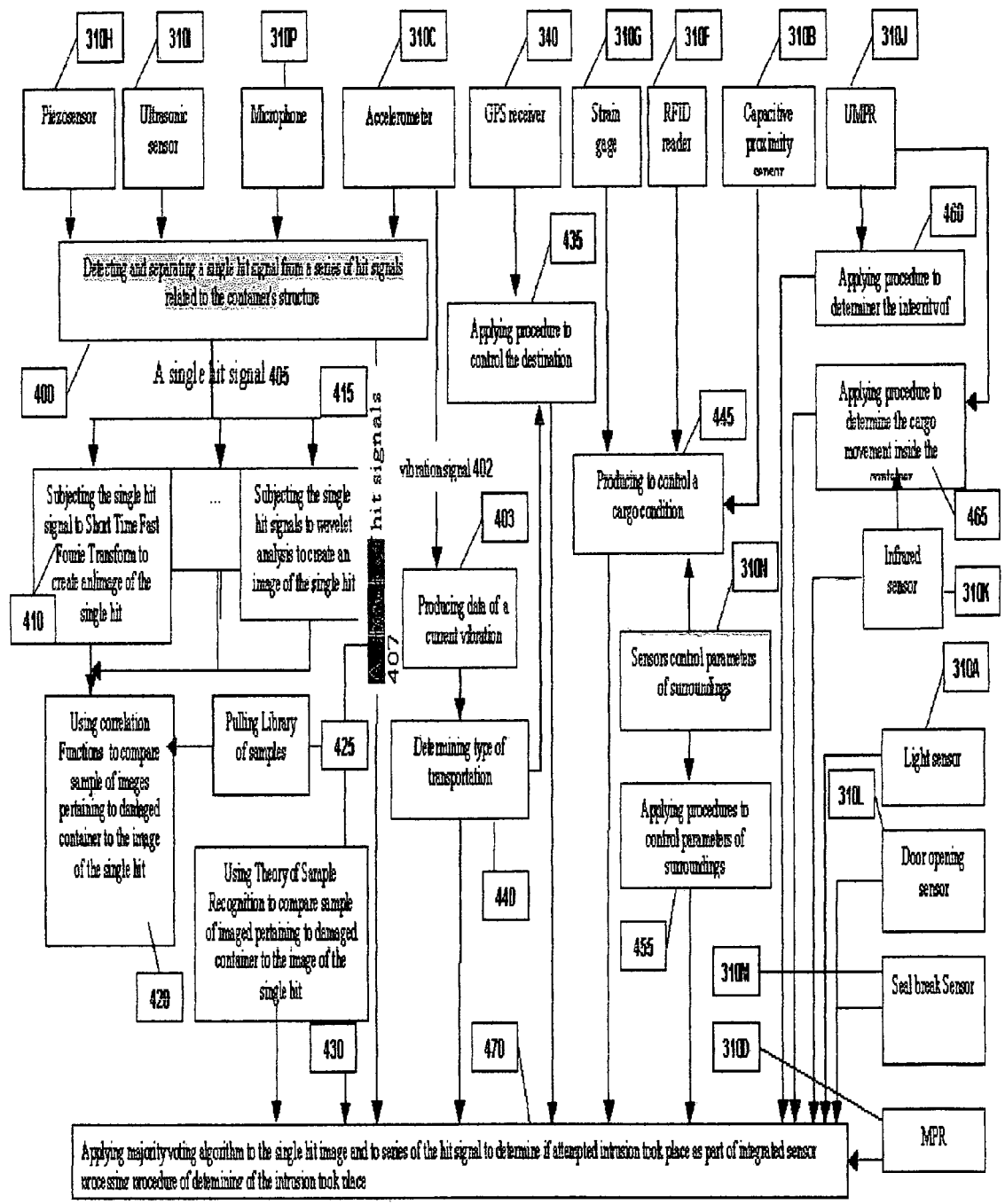
FIG. 4 Method for detecting and registering container break-ins

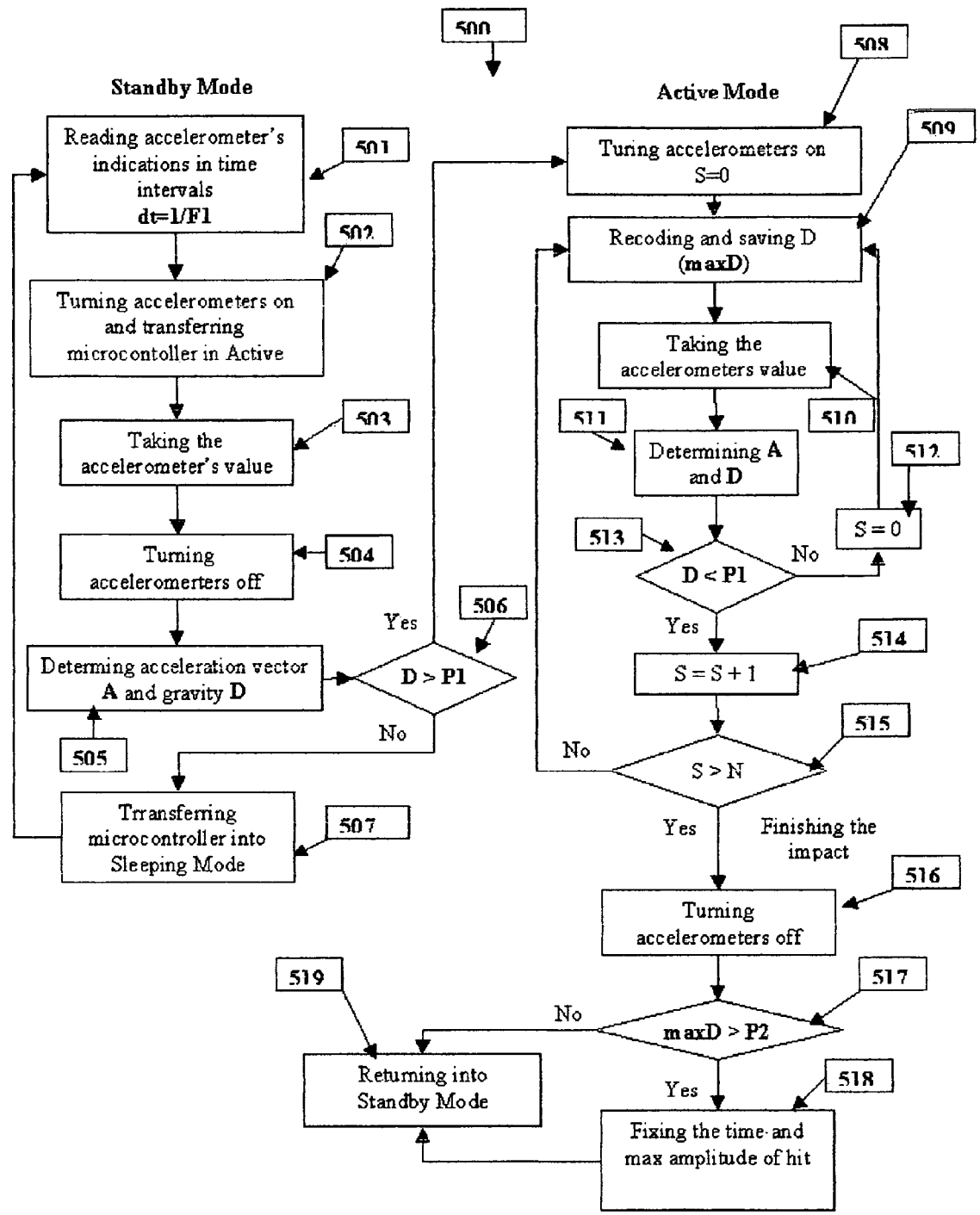
FIG. 5 Method of detecting and registering a container intrusion signal by accelerometers

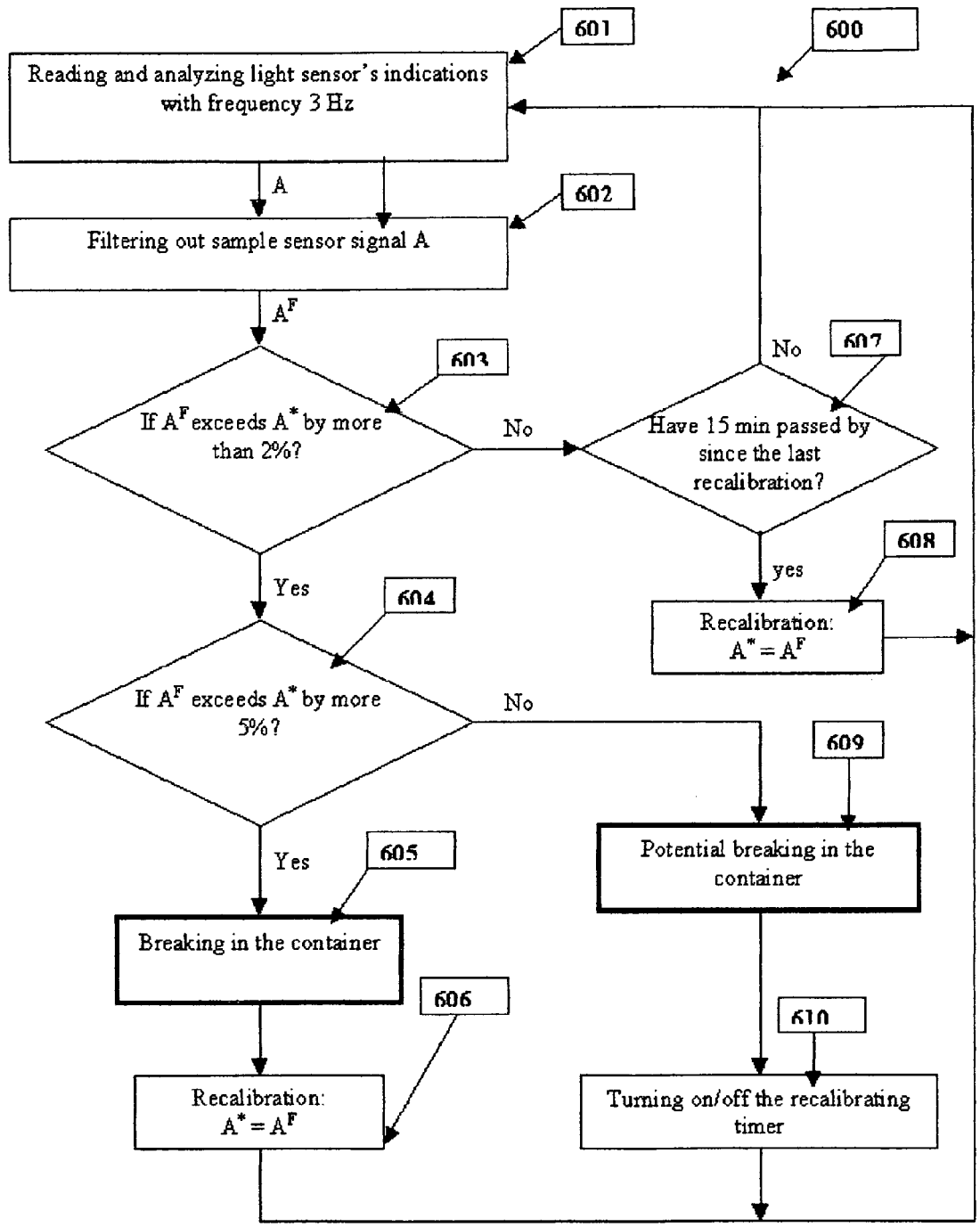
FIG. 6 Method for detecting and registering a container intrusion signal by a light sensor

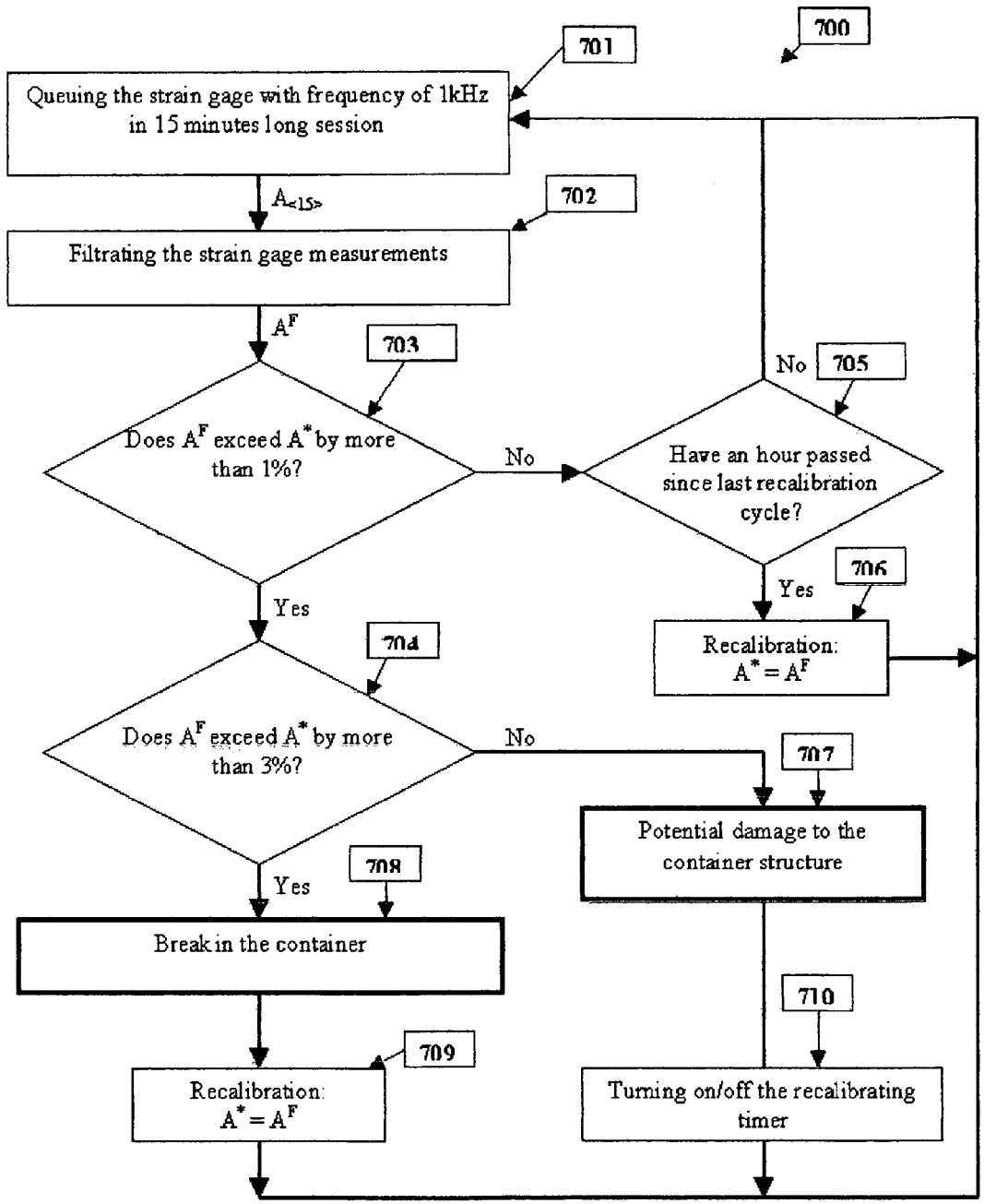
FIG. 7 Method for detecting and registering a container intrusion signal by a strain gage

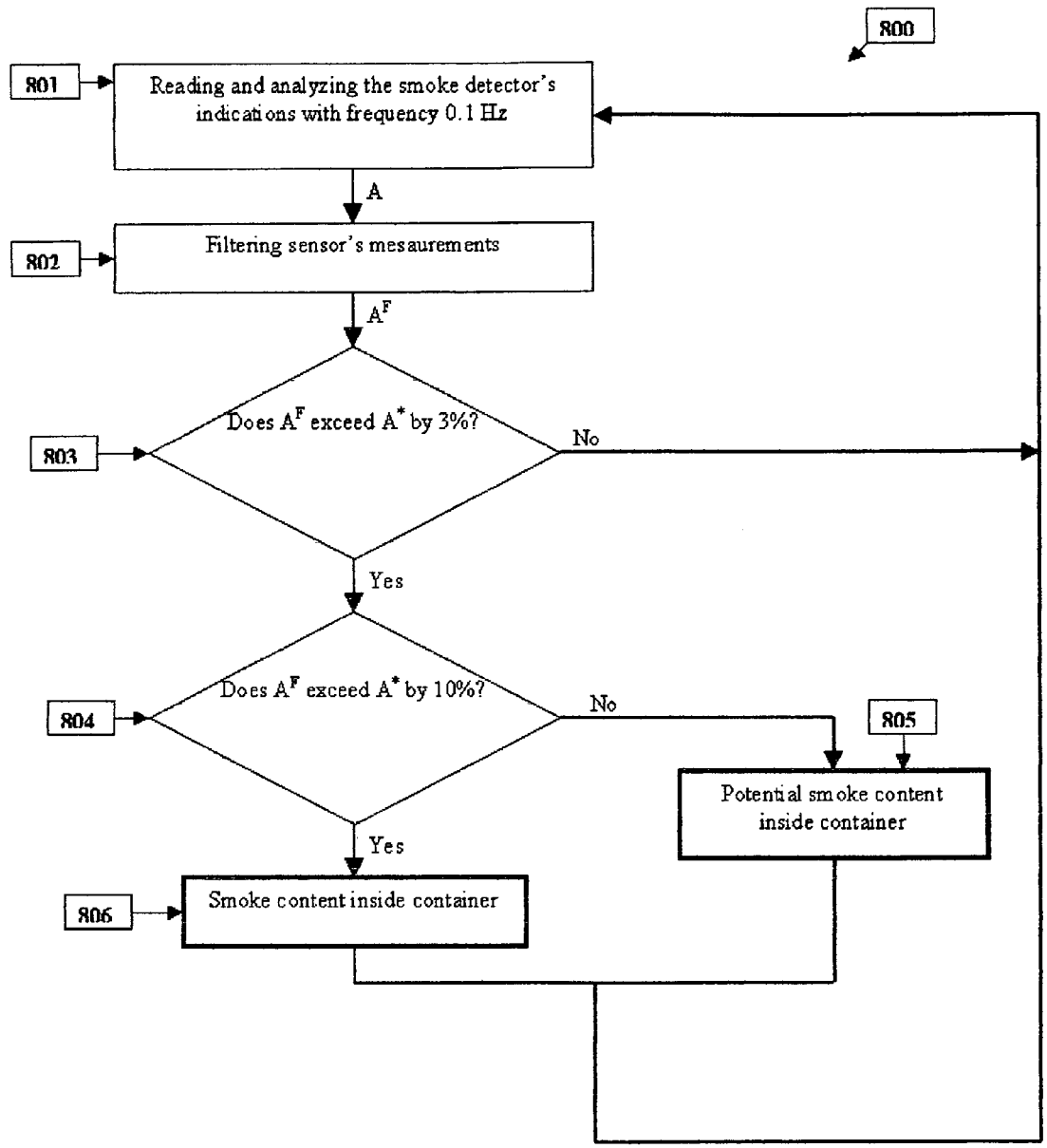
FIG. 8 Method for detecting and registering a container intrusion signal by a smoke detector

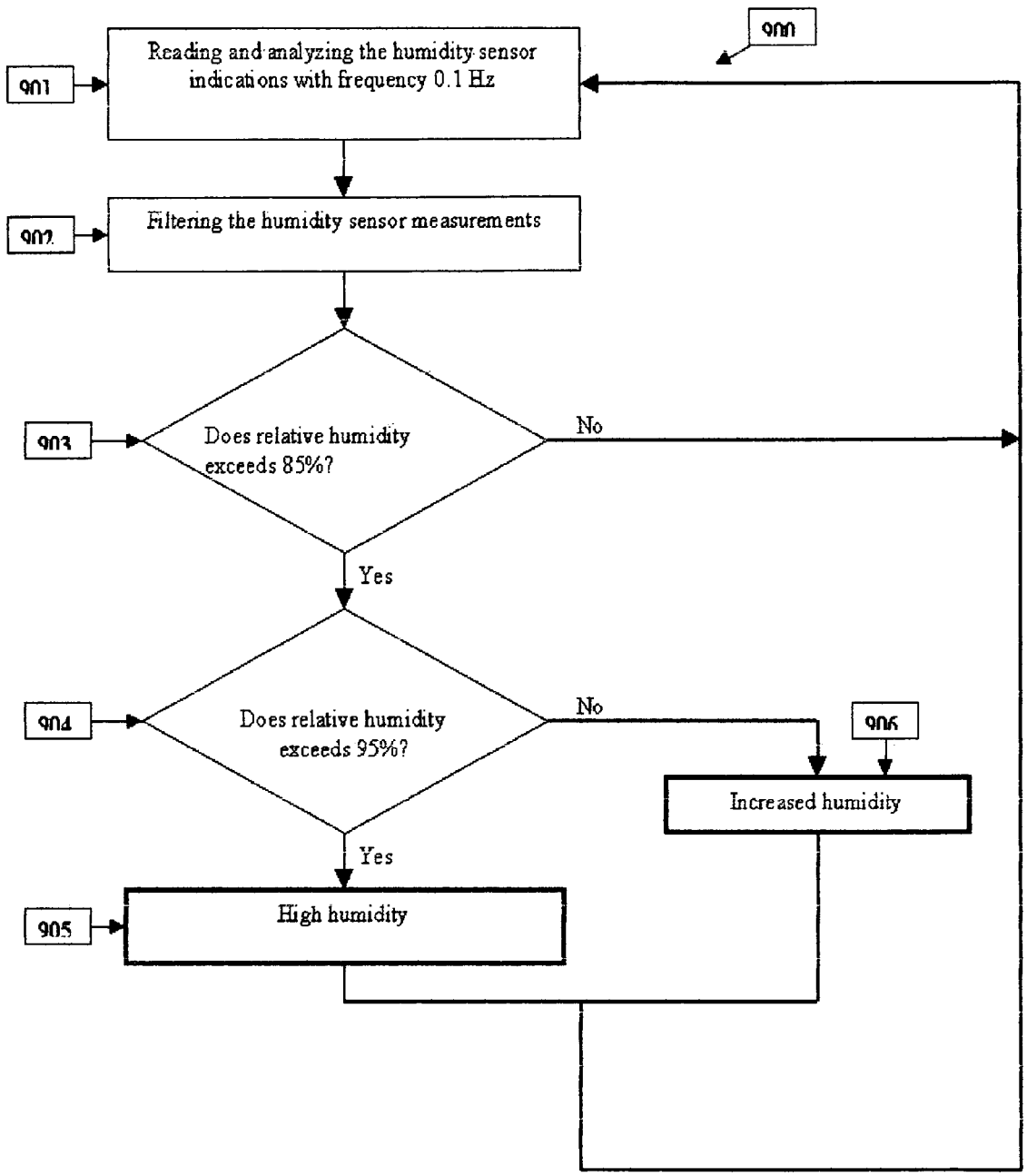
FIG. 9 Method for detecting and registering container intrusion by a humidity sensor

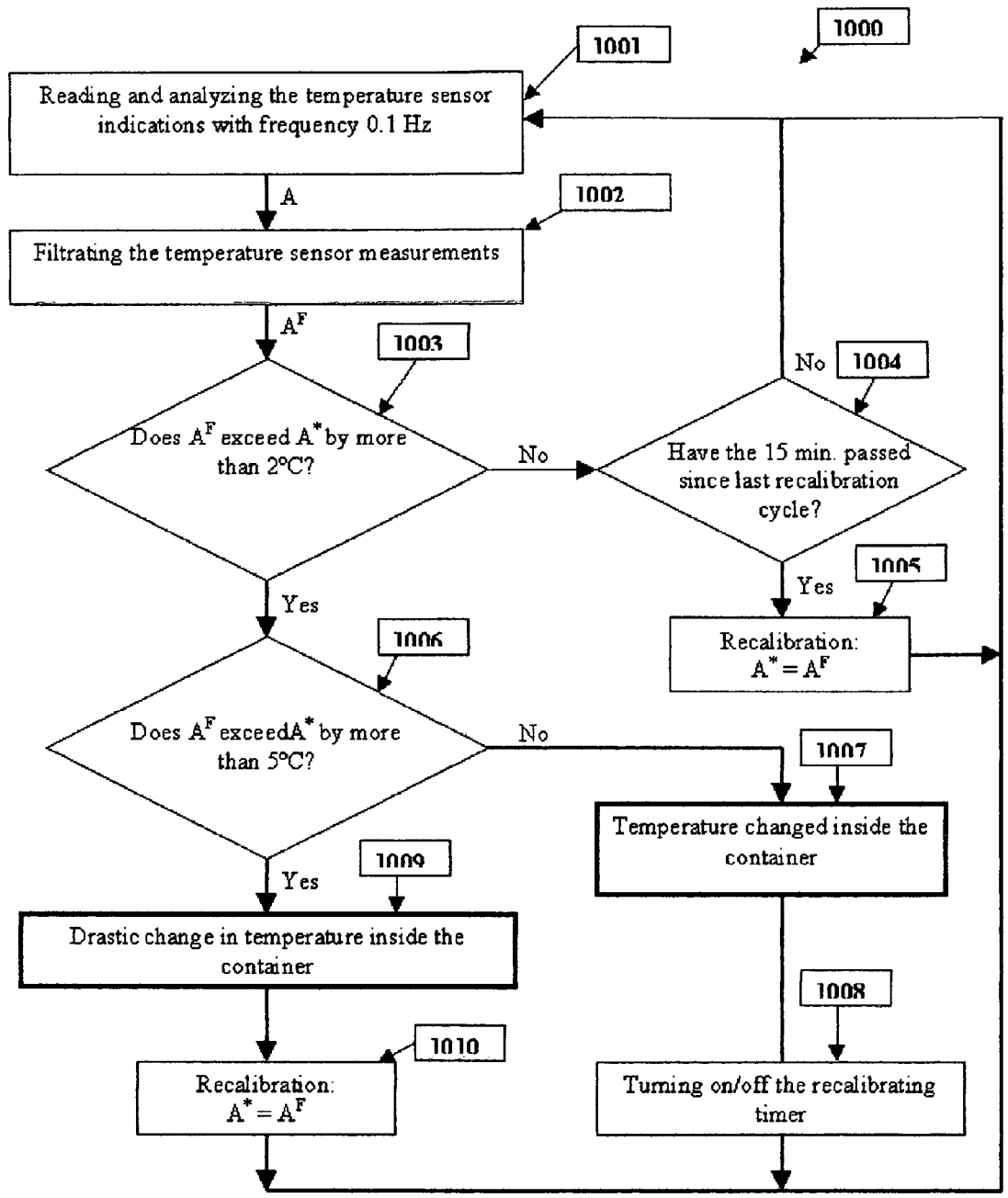
FIG. 10 Method for detecting and registering a container intrusion signal by temperature sensor

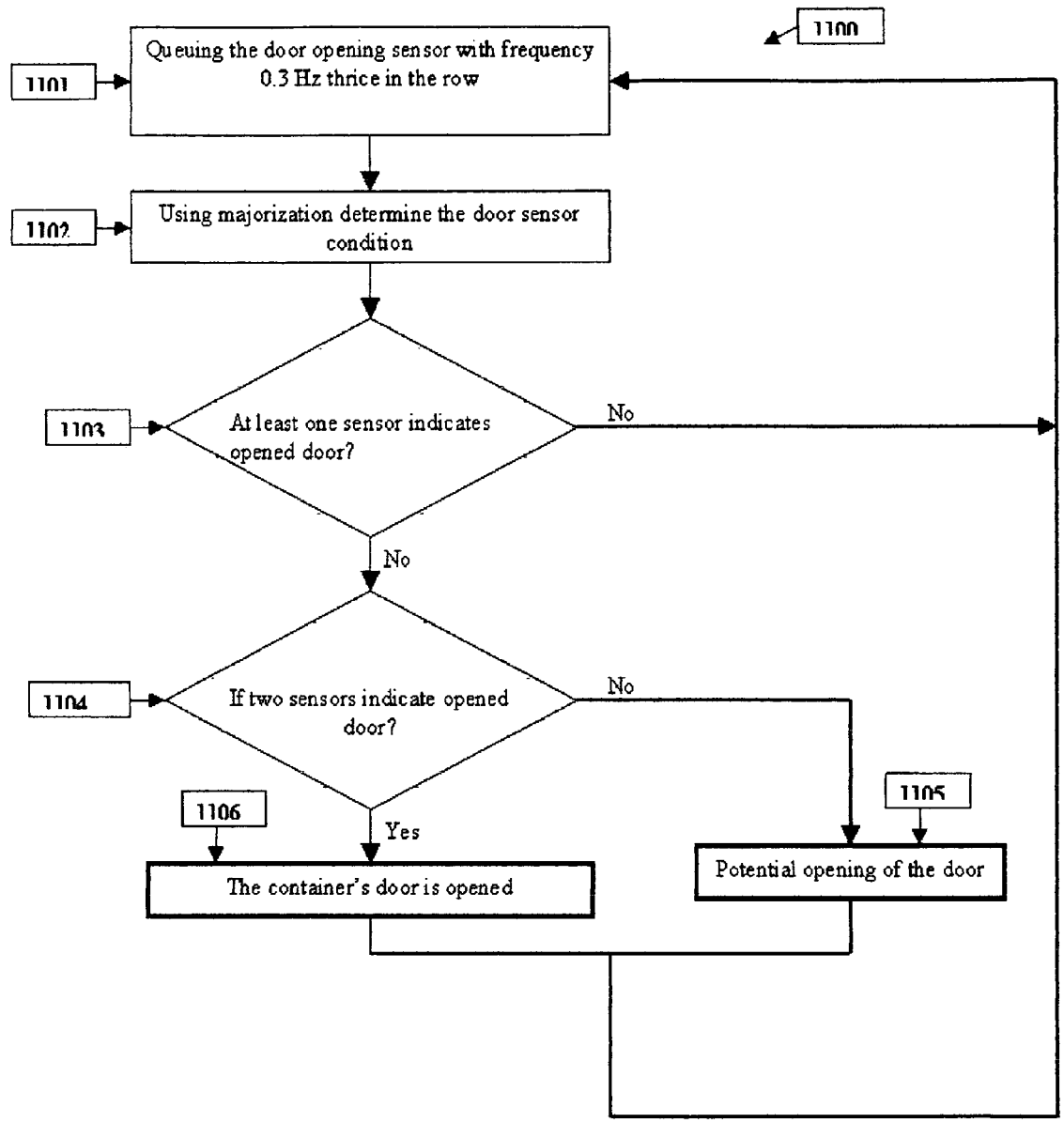
FIG. 11 Method for detecting and registering a container intrusion signal by a door-opening sensor

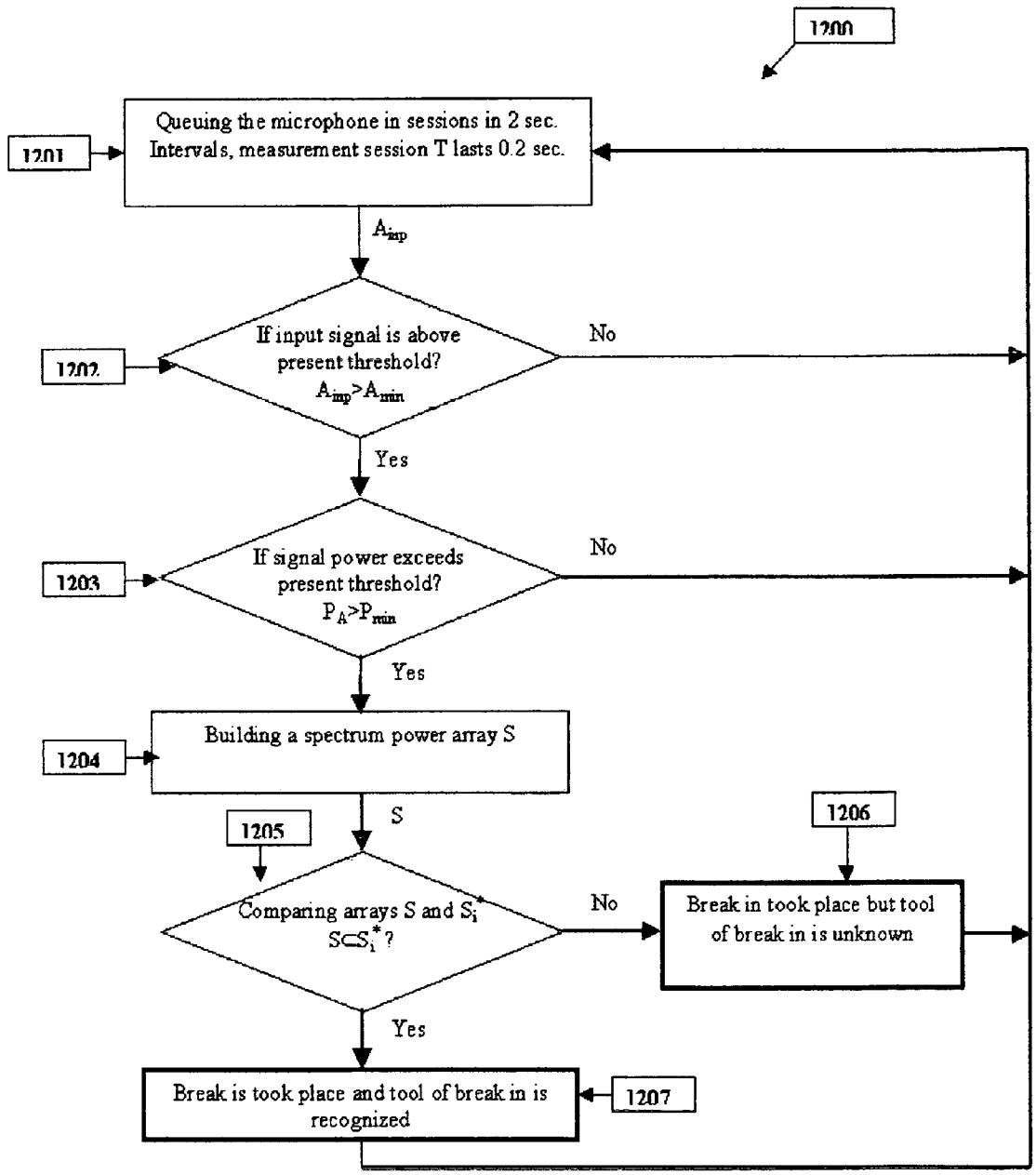
FIG. 12 Method for detecting and registering a container intrusion signal by a microphone

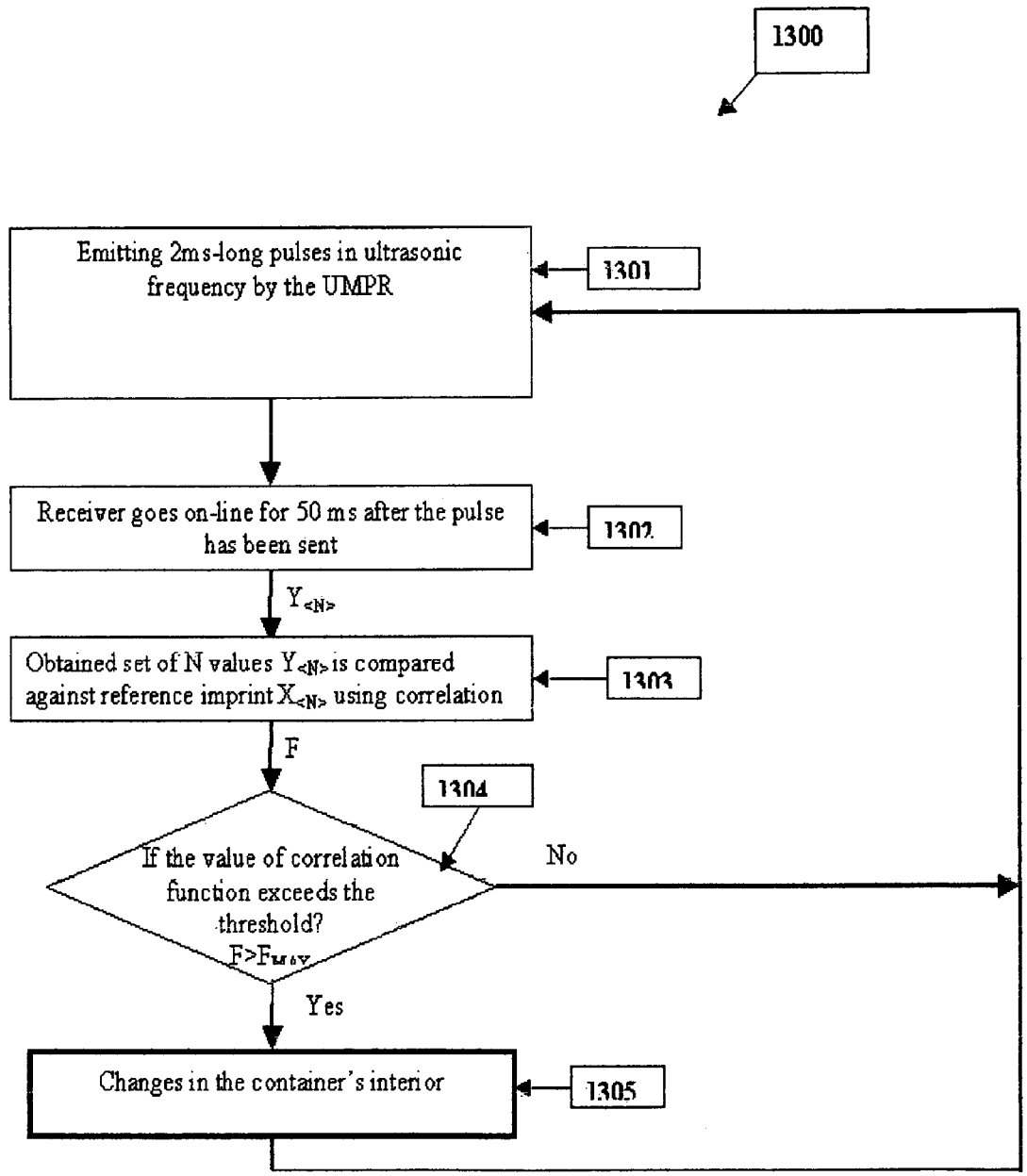
FIG. 13 Method for detecting and registering ad container intrusion signal by a UMPR

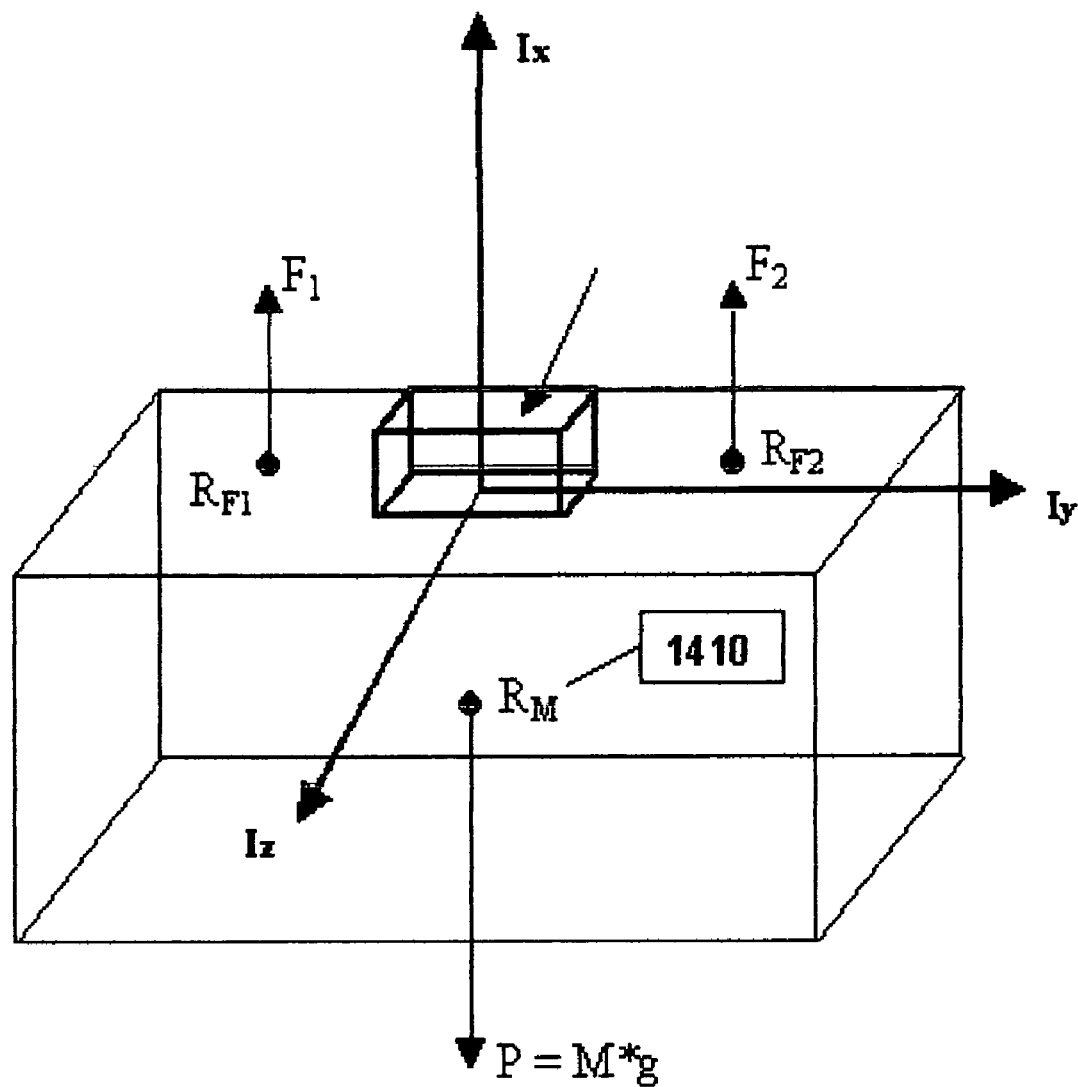
FIG. 14 Parameters for Digital Signature

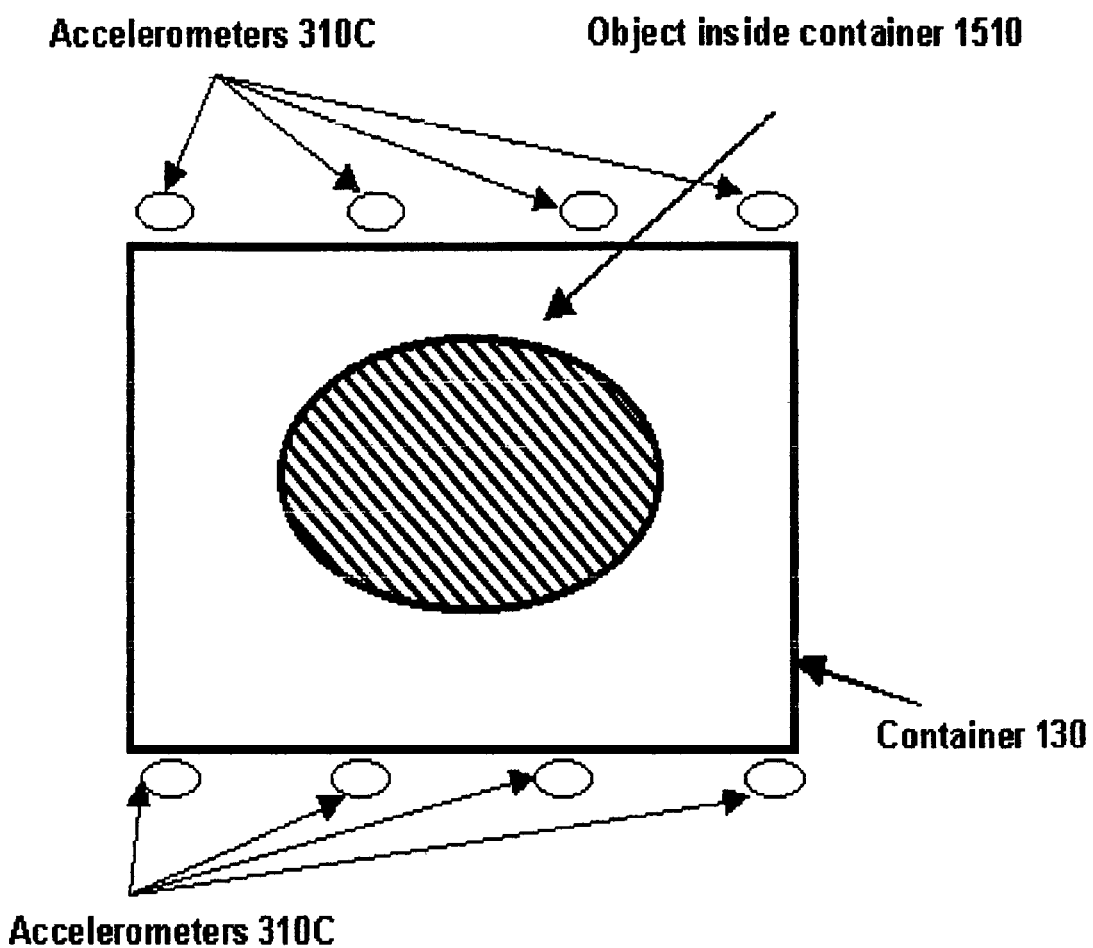
FIG. 15 Mass-tomograph 1500

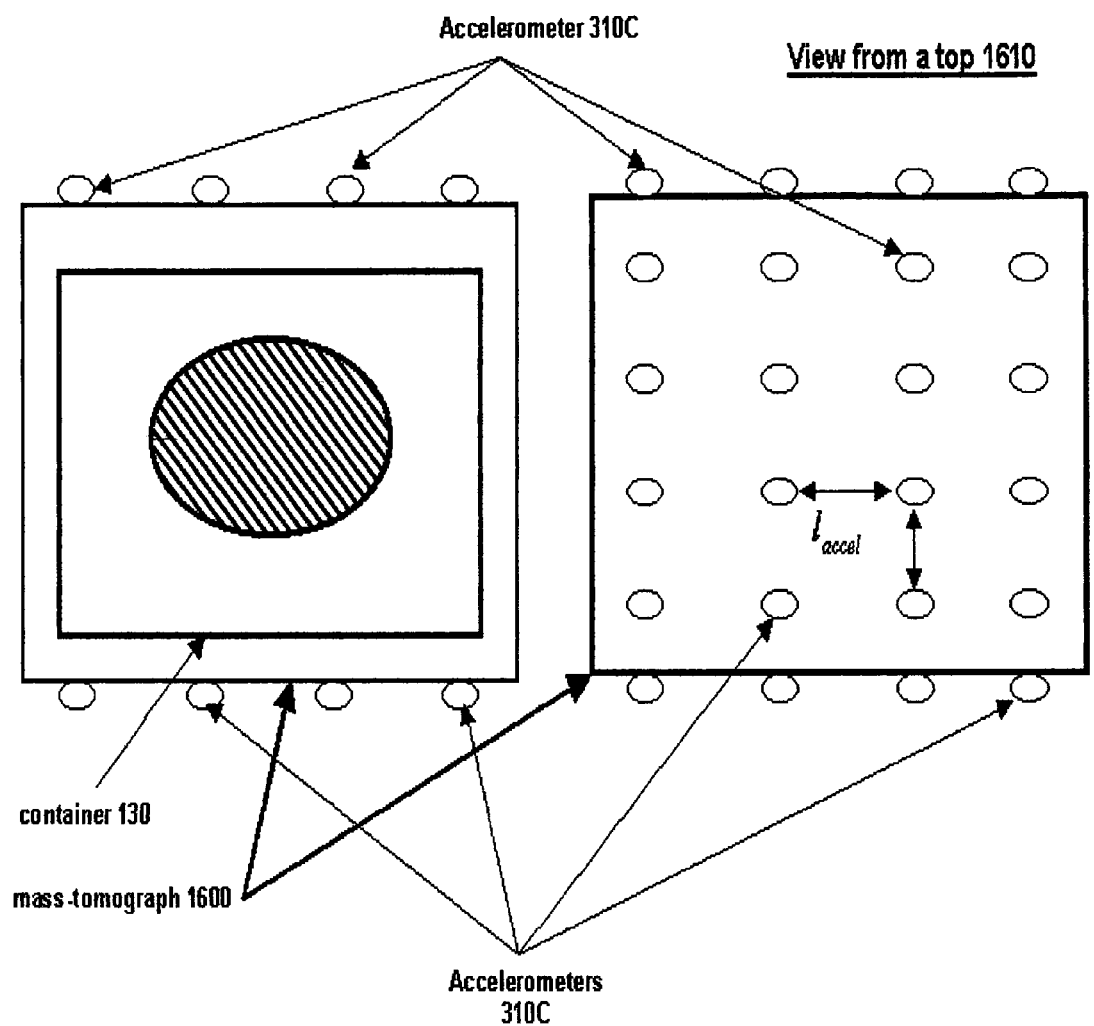
FIG. 16 Mass-tomograph container is in steady position

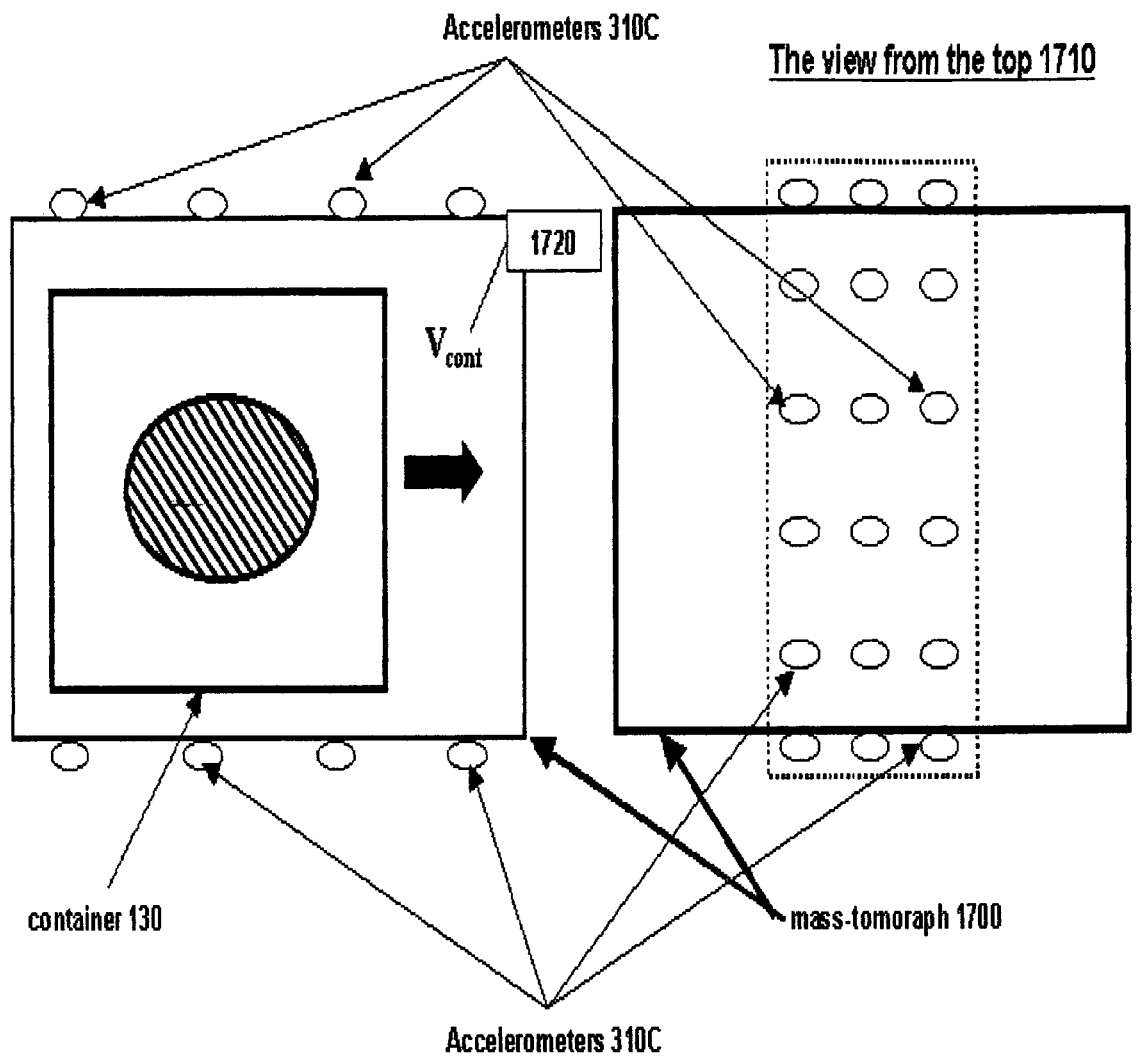
FIG. 17 Mass-tomograph container is in moving position

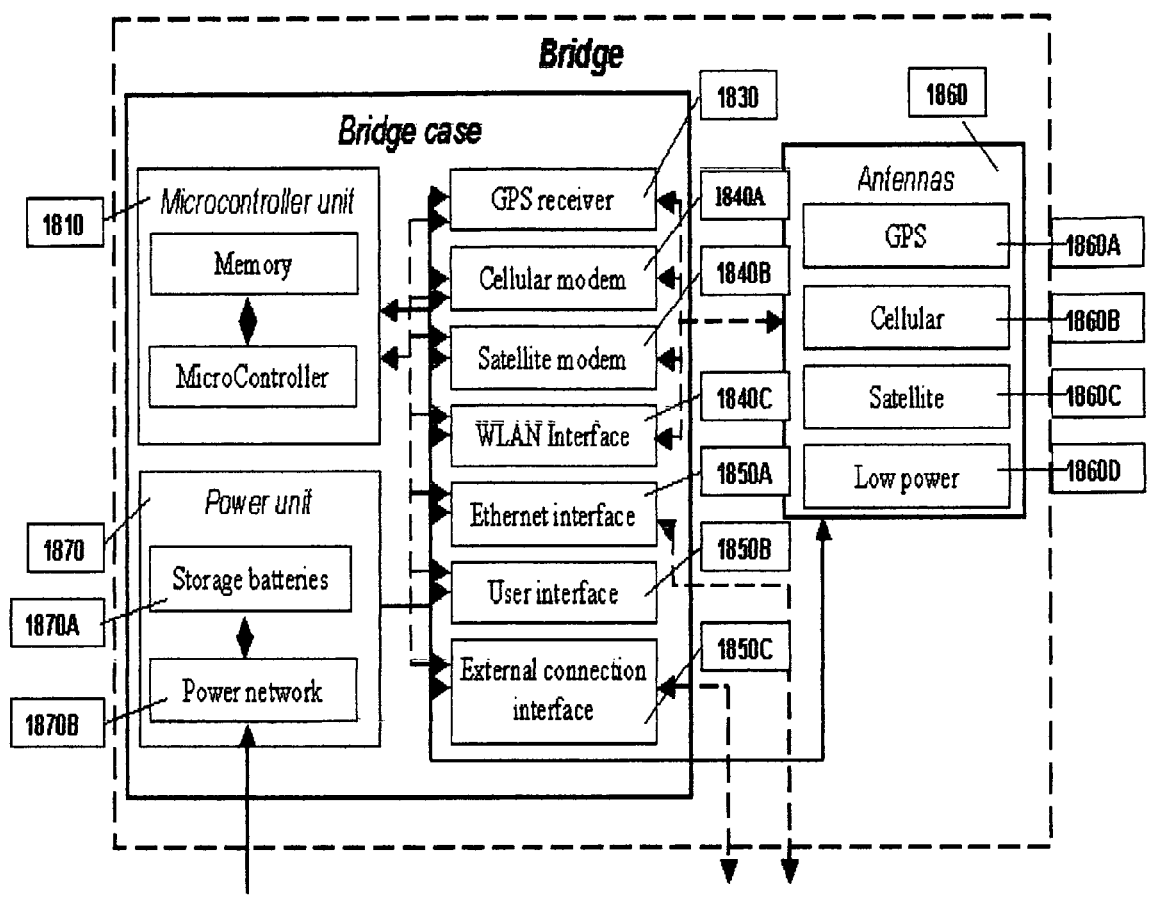
FIG. 18 Bridge Structure

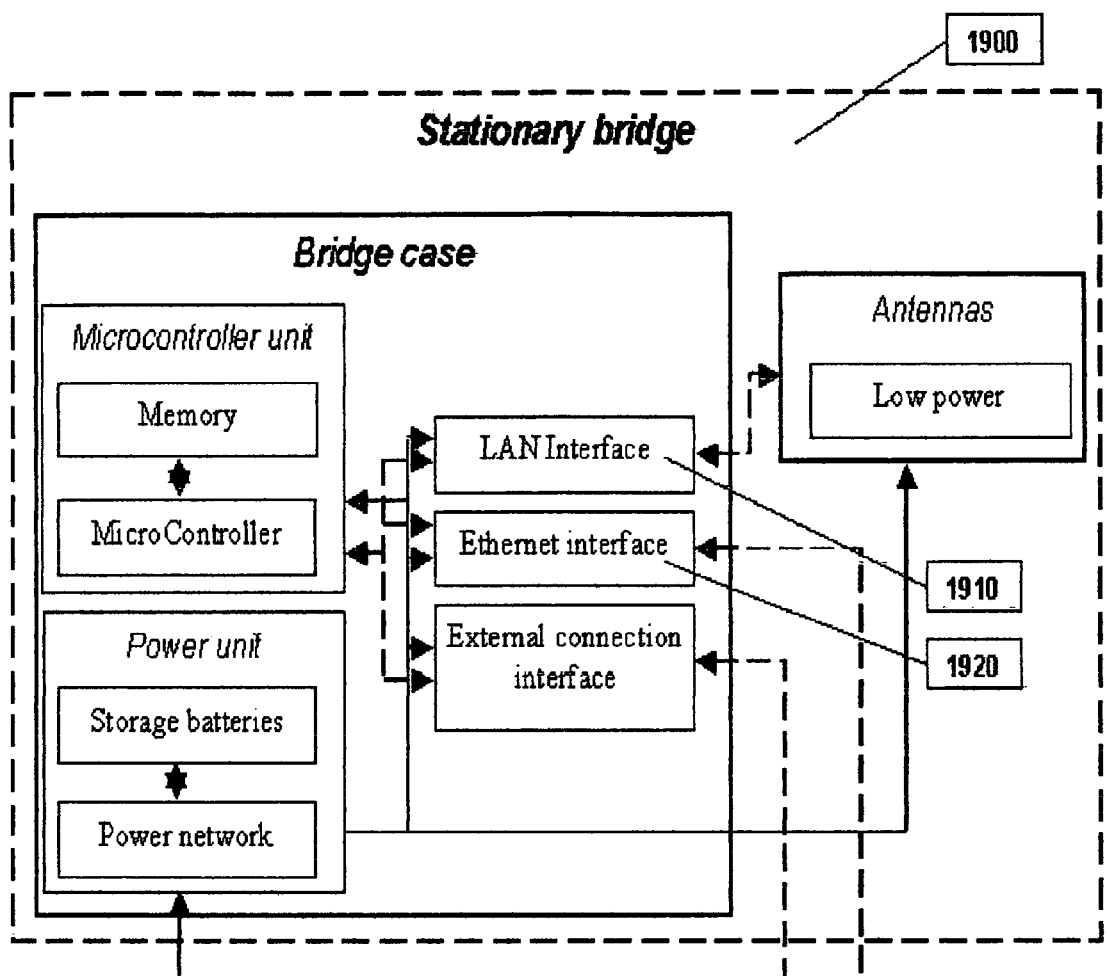
FIG. 19 Stationary Bridge Structure

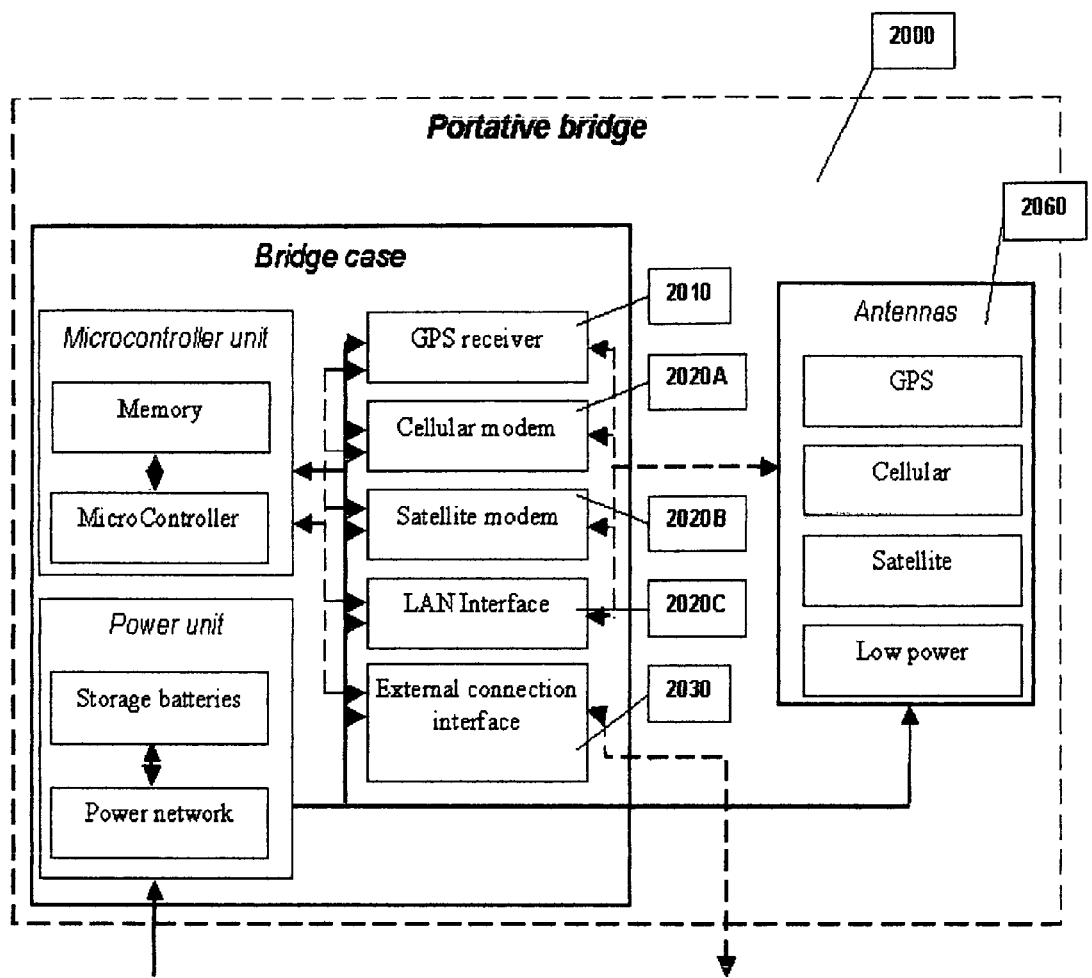
FIG. 20 Portative Bridge Structure

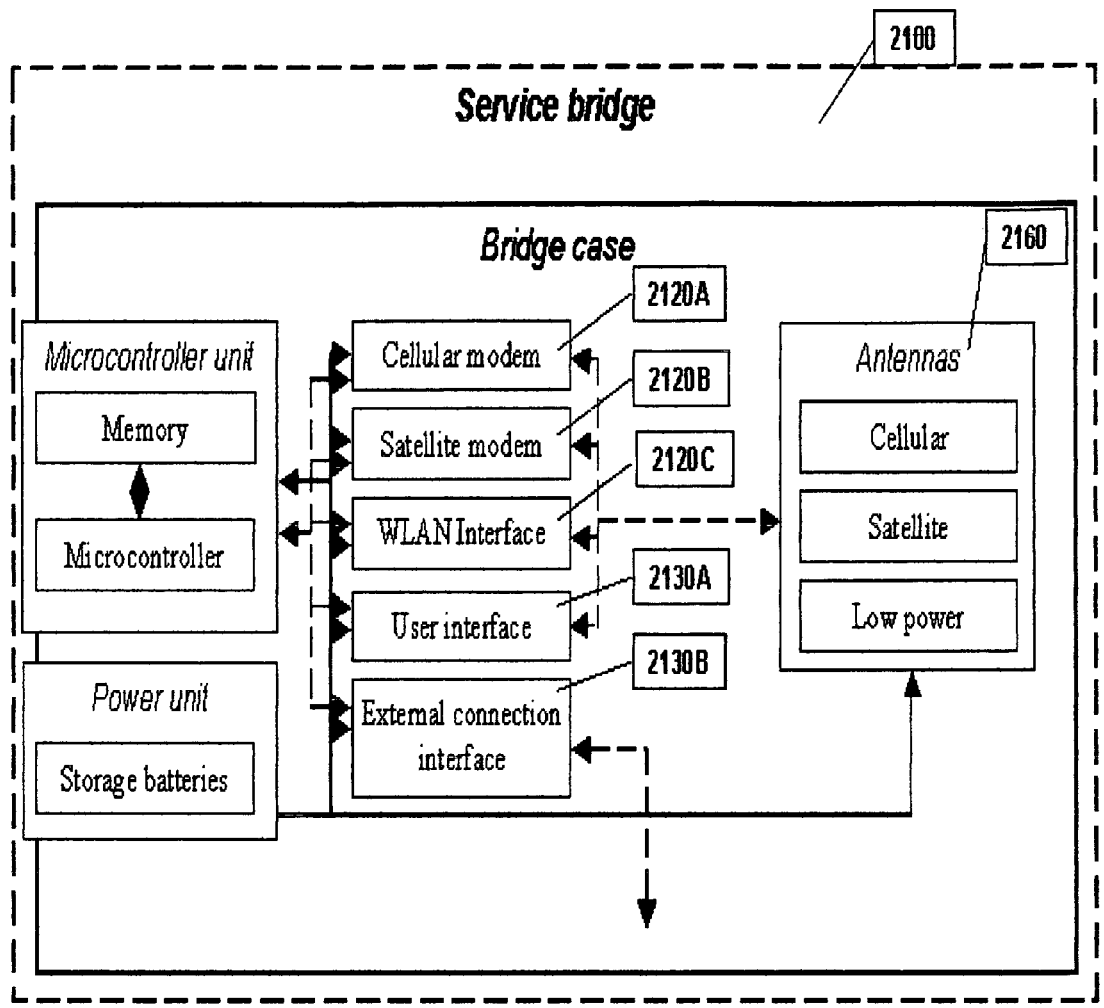
FIG. 21 Service Bridge Structure

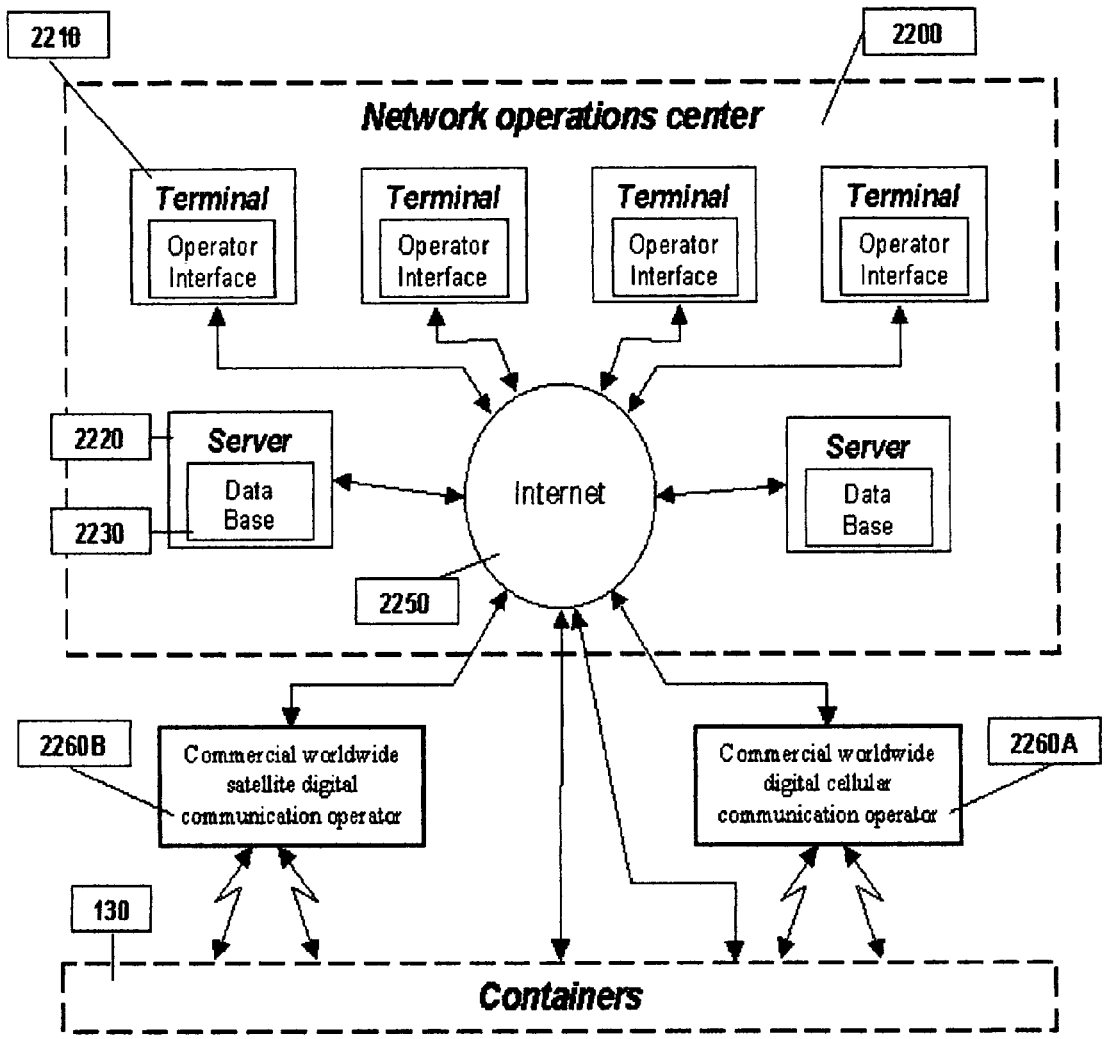
FIG. 22 NOC Structure 170

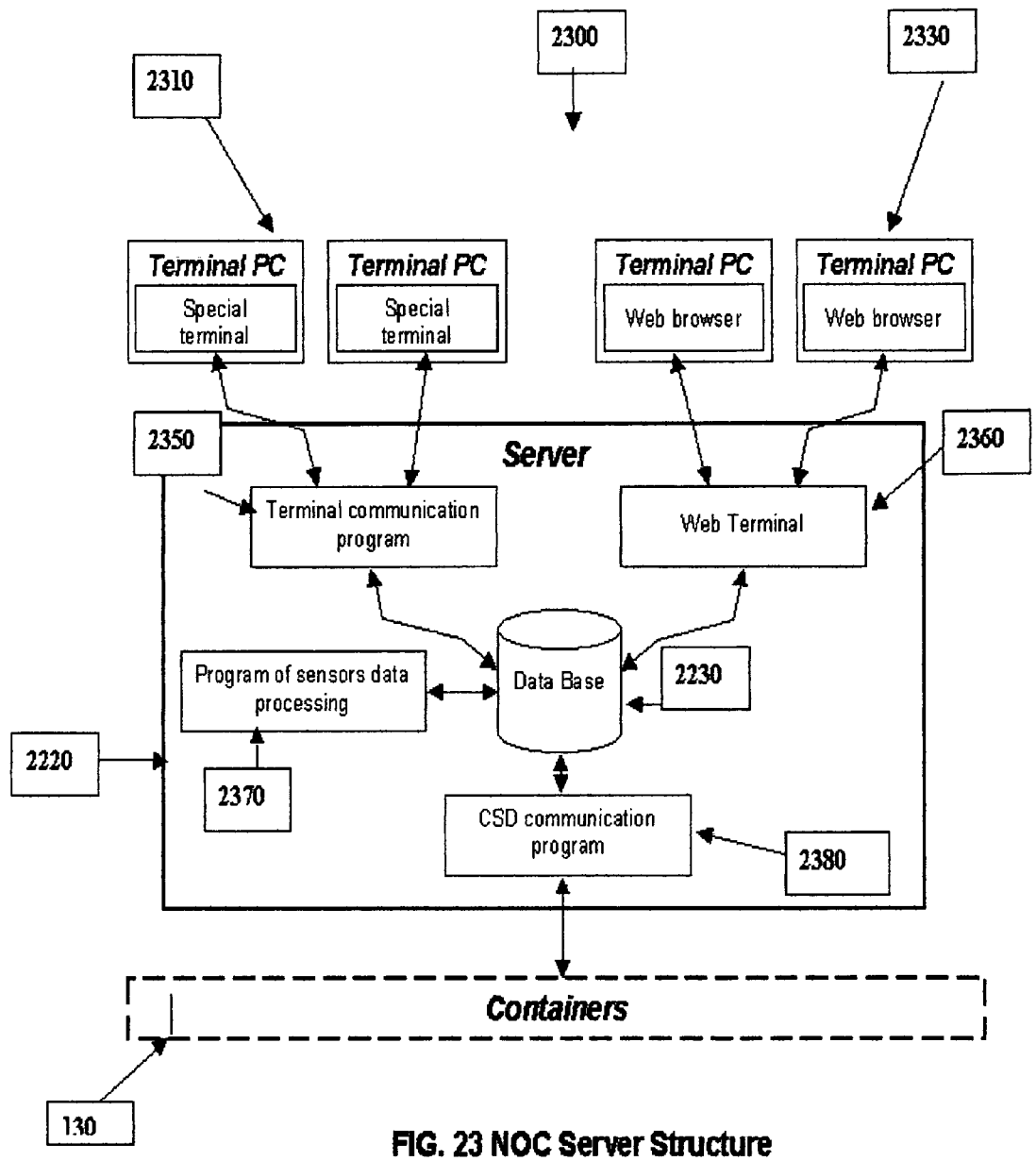
FIG. 23 NOC Server Structure

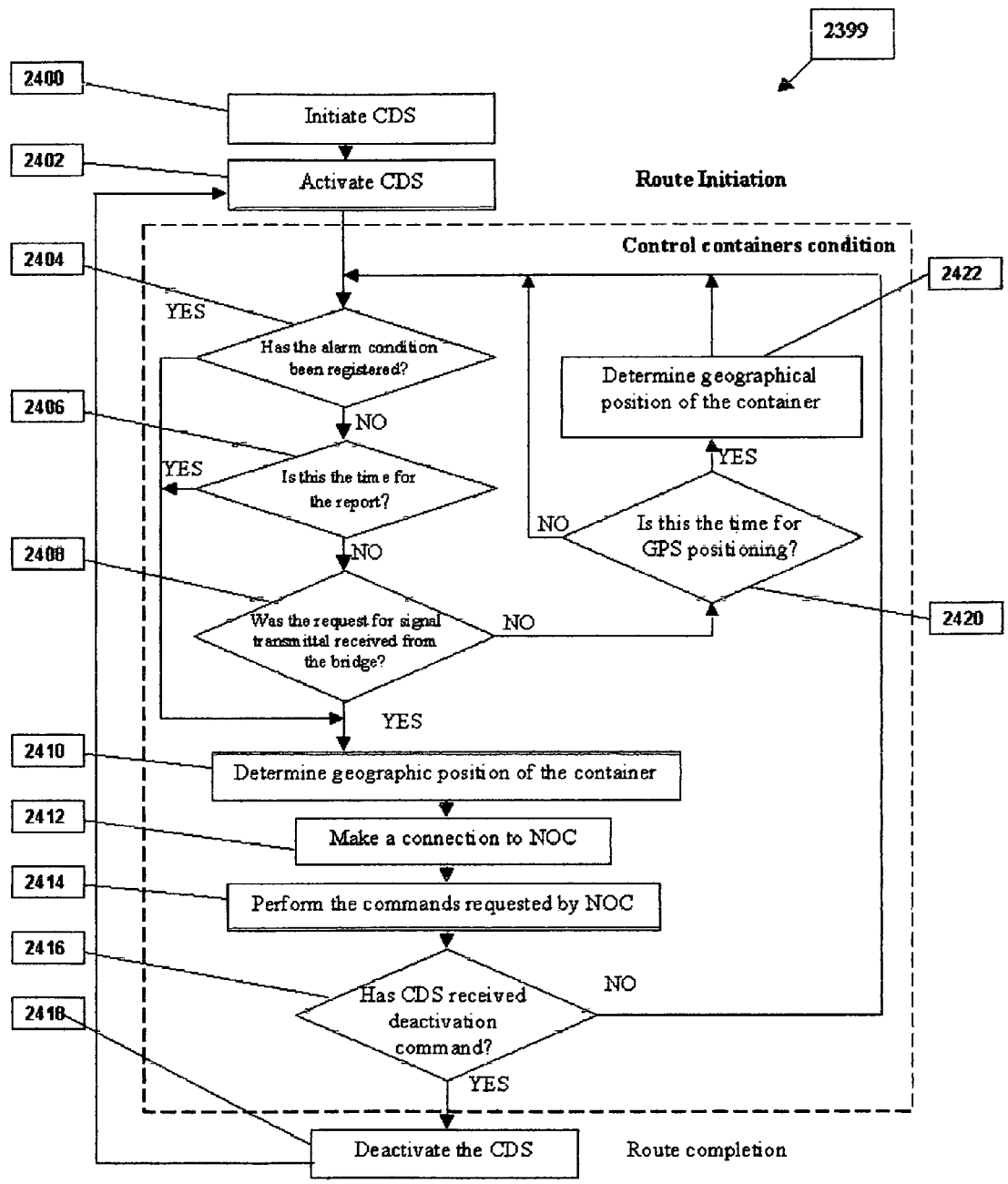
FIG. 24 Method of monitoring containers integrity (general)

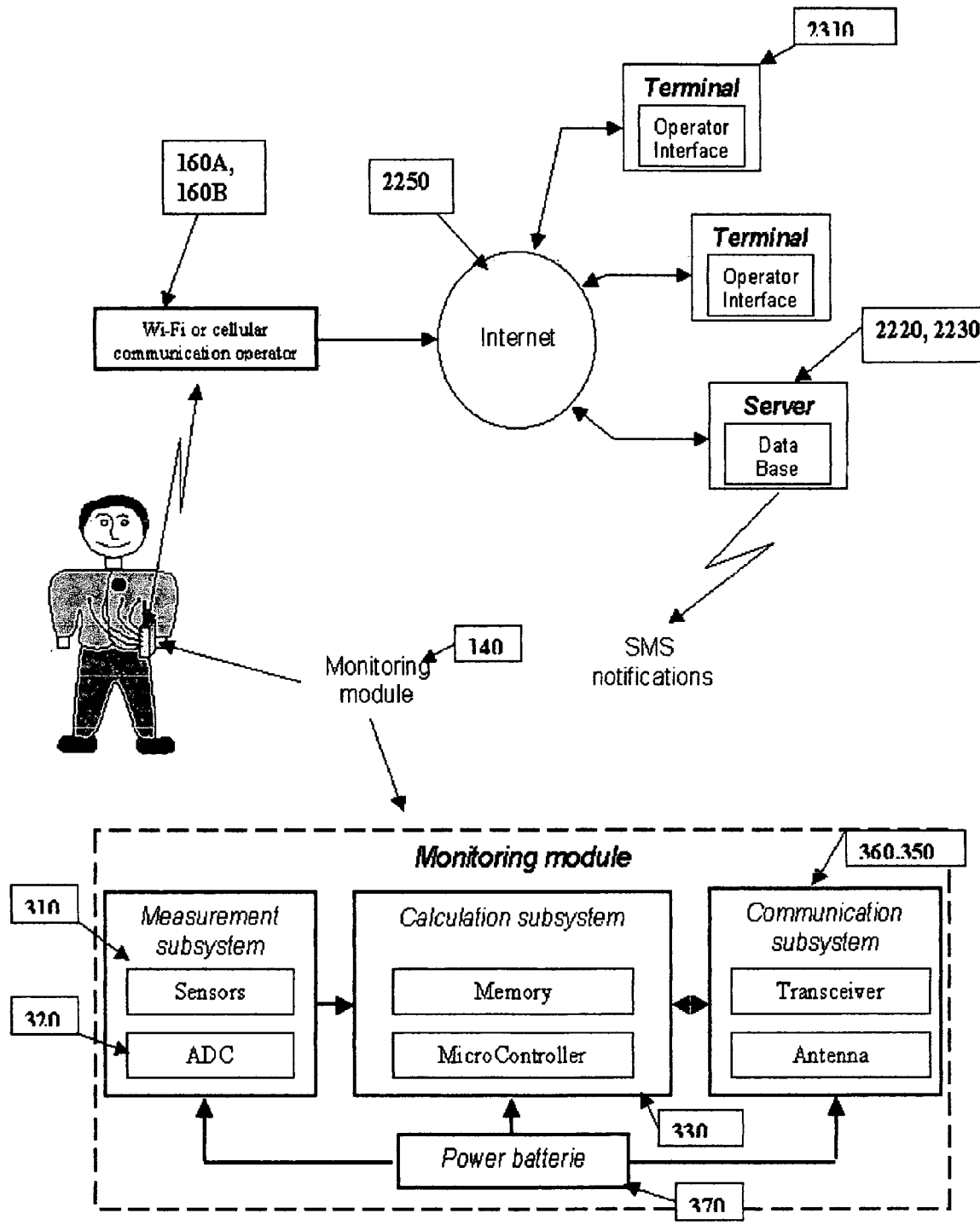
FIG. 25 Personal conditions monitoring system

TRANSPORTATION SECURITY SYSTEM AND ASSOCIATED METHODS

This application claims the priority filing date from the previously filed provisional application Ser. No. US60/648,260 filed on Jan. 28, 2005.

BACKGROUND

The vast majority of goods shipped throughout the world are shipped via what are referred to as intermodal freight containers. As used herein, the term "container" includes any container (with or without wheels attached) that is not transparent to radio frequency signals, including but not limited to, intermodal freight containers. The most common international freight containers are known as International Standard Organization (ISO) dry intermodal containers, meaning they meet certain specific dimensional, mechanical and other standards issued by the ISO to facilitate global trade. These containers have specific dimensional, mechanical and other standards issued by the ISO to facilitate global trade by encouraging development and use of compatible standardized containers, handling equipment, ocean-going vessels, railroad equipment and over-the-road equipment throughout the world for all modes of surface transportation of goods. The are currently more than 12 million such containers in active circulation around the world as well as many more specialized containers such as refrigerated containers that carry perishable commodities. The United States alone receives approximately six million loaded containers per year, or approximately 17,000 per day, representing nearly half of the total value of the total value of all goods received each year. Since approximately 90% of all goods shipped internationally are moved in containers, container transport has become the backbone of the world economy.

Cargo loss due to theft has become a serious problem. Cargo is often misappropriated by shipping company employees, cargo handlers, and/or security personal. Many insurance professionals believe that more than half of all major cargo thefts are planned in logistics departments, by employees at the shipper or manufacturer who are thought to be trustworthy. Certain authorities believe that gangs operating in many metropolitan areas are actually training some of their members in logistics so that they will be eligible for employment at desirable trucking, warehousing or forwarding firms.

Because of the emergence of terrorist threats and activities, container security has become a national security issue. Terrorists are exploiting transportation modalities such as air, rail, truck-trailer, vessel-barge and bus. As evidenced by recent attacks, terrorists are directing, or seeking to direct, mobile transportation assets into office building and/or other heavily populated areas.

Shipping containers may also be used by terrorists for the arms shipments. Of greatest concern is the shipment of nuclear, chemical, or biological materials that can be used to produce weapons of mass destruction. Some of these materials are relatively small in size and could be hidden in shipping containers without being detected by governmental authorities. If such weapons were to fall into the wrong hands the results could be devastating.

With the above scenarios in mind, improving container security is desired. In one approach that is commonly in use, a locking mechanism or security seal are applied to container doors, to seal the cargo within the container. However, anyone who possesses the key or the combination, whether authorized or not, may gain access to the interior of a container. Further, the locks can be easily picked or removed by other means. Thus, locking devices are a limited deterrent to thieves or terrorists.

In another approach an electronic seal ("e-seal") may be applied to a container. These e-seals are similar to traditional door seals and applied to the containers via the same, albeit weak, door hasp mechanism. These e-seals include an electronic device, such as a radio or radio reflective device, that can transmit the e-seal's serial number and a signal if the e-seal is cut or broken after installation. However, the e-seal does not communicate with the interior or contents of the container and does not transmit information related to the interior or contents to other devices.

The e-seal typically employs either a low power radio transceiver or uses radio frequency backscatter techniques to convey information from an e-seal to a reader installed at, for example, a terminal gate. The radio frequency backscatter technique involves use of a relatively expensive, narrow band, high-power radio technology based on a combination of radar and radiobroadcast technologies. The radio frequency backscatter technology requires that a reader send a radio signal of relatively high transmitted power (i.e., 0.5-3 W) that is reflected or scattered back to the reader with modulated or encoded data from the e-seal.

Furthermore, the e-seals are not effective at monitoring security of the container. For example, other methods of intrusion into the container may occur (e.g. breaching other parts of the container such as the side walls). Further, a biological agent may be implanted into the container through the container's standard air vents.

SUMMARY

Present world wide transportation security system (transportation security system) provides cost effective and reliable system of and method for: (1) registering any event in connection with breach of any wall in a container; (2) detecting an opening, a closing and a removal of the container's doors; (3) monitoring the condition of all seals and locks on the container; (4) monitoring a cargo conditions inside the container; (5) detecting human or an animal inside the container; (6) monitoring the container's movement; (7) detecting weapons of mass destruction in the container; (8) registration of movement inside the container; (9) measuring cargo weight inside the container; (10) registering environmental parameters inside the container (temperature, humidity, smoke . . . etc.); and (11) simultaneously providing means for tracking movements of the container for reasons of security and logistic efficiency. The integrity system may generate false alarms with the probability equal to or better than of $10^{-5}:10^{-6}$.

The transportation security system provides intermodal threat identification, detection, and notification transportation security system. The transportation security system may be applied to all transpiration modalities including air, rail, truck, ship, barge and bus transport modes. The instant security system provides inexpensive means to monitoring each shipping container. Container tempering may be detected and reported rapidly. Thus, present transportation security system could be a credible defense mechanism against terrorist attempts to smuggle weapons, weapons materials, and/or terrorist personnel by preventing unauthorized access to shipping containers. The threat of cargo theft or piracy is also mitigated. Thus, present transportation security system provides governmental and law enforcement agencies with the means to respond, in real-time, to cargo theft, piracy, and/or terrorist attacks.

One aspect of the present application is security system for monitoring at least one shipping container. The system includes a Container Security Device (CSD) configured to be removably coupled to the at least one shipping container the CSD monitors a cargo inside the container and detects intrusion the container. The CSD includes at least one anti-tamper sensor, a microcontroller and a communication device. The microcontroller generates an alert status based on an output signals from at least one sensor. The output signals may be subjected to an individual sensor processing procedure and then to an integrated sensor processing procedure. The integrated sensor processing procedure makes a decision of the container alert status based on the output status of the at least one sensor. A Network Operations Center (NOC) includes a NOC communications facility configured to communicate with at least one telecommunication network. The NOC being configured to receive data from one or more CSDs. The NOC includes a data storage medium configured to store sensor data and contained an archive of the container events.

In another aspect, the present application includes a transportation security system for monitoring a plurality of shipping containers being transported by a plurality of cargo transport vehicles. Each of the plurality of cargo vehicles transports at least one shipping container. The system includes a CSD removably coupled to the at least one freight shipping container for monitoring a cargo inside the container and detection of intrusion violations. The CSD includes at least one sensor. The CSD also includes a microcontroller and communication device. The system may also include a plurality of bridges. Each bridge of the plurality of bridges may be disposed in one cargo transport vehicle. Each bridge may include a communication system being configured to communicate with the CSDs and a NOC. The bridge may also includes a data storage medium configured to store data pertaining to container events. A NOC communicates with each of the plurality of bridges and CSDs. The NOC may receive data from one or more of the plurality of bridges and CSDs. The NOC includes a data storage medium configured to store one or more of sensor data and container events.

In another aspect, the present application includes a method for monitoring at least one shipping container being transported by at least one cargo transport vehicle. The method includes providing a CSD configured to be removably coupled to the at least one shipping container for monitoring a cargo inside the container and detecting intrusion violations. The CSD includes at least one sensor. The CSD includes a microcontroller and a CSD communications device. The method may also include sending output data obtained from at least one sensor to the microcontroller.

In another aspect, the present application includes a method for monitoring at least one shipping container being transported by at least one cargo transport vehicle from a point of origin to a destination point. The method includes providing route data corresponding to the path traversed by at least one cargo transport vehicle from a point of origin to a destination point. An actual position of at least one cargo vehicle is monitored to determine whether the actual position of the vehicle corresponds to the route data. An alert status condition is generated when the actual position of the vehicle does not correspond to the route data. A NOC is notified of the alert status.

In another aspect, the present application includes a computer readable medium having stored thereon a data structure for packetizing data transmitted between a CSD and a bridge. The CSD being removably coupled to at least one shipping container disposed on a cargo transport vehicle. The bridge is disposed on the cargo transport vehicle. The data structure includes: a container CSD identification field containing data that uniquely identifies the container CSD; and a field containing either CSD status data or bridge command data depending on a course of the packet.

In another aspect, the present application includes a computer readable medium having stored thereon a data structure for packetizing data being transmitted between a bridge and a NOC. The bridge being configured to monitor at least one container CSD configured to be removably coupled to the at least one freight shipping container disposed on a cargo transport vehicle. The bridge being disposed on the cargo transport vehicle. The data structure includes: a bridge identification field containing data that uniquely identifies the container CSD; and a field containing either bridge-status or the NOC command data depending on the source of the packet.

In another aspect, the present application includes a personal conditions monitoring system. The system includes a monitoring module. The monitoring module includes sensor array and ADC. The system includes a communication subsystem and a power subsystem with replaceable batteries. The communication subsystem includes transceiver and antenna.

Additional features and advantages of the invention will be set forth in the detailed description which follows, and in part will be readily apparent to those skilled in the art from that description or recognized by practicing the invention as described herein, including the detailed description which follows, the claims and the drawings.

BRIEF DESCRIPTION OF THE DRAWINGS

FIG. 4 is a flowchart illustrating one exemplary method for detecting and registering a container intrusion signal.

FIG. 5 is a flowchart of method for detecting and registering a container intrusion signal by accelerometer.

FIG. 6 is a flowchart of method for detecting and registering a container intrusion signal by a light sensor.

FIG. 7 is a flowchart of method for detecting and registering a container intrusion signal by a strain gage.

FIG. 8 is a flowchart of method for detecting and registering a container intrusion signal by a smoke detector.

FIG. 9 is a flowchart of method for detecting and registering a container intrusion signal by a humidity sensor.

FIG. 10 is a flowchart of method for detecting and registering a container intrusion signal by a temperature sensor.

FIG. 11 is a flowchart of method for detecting and registering a container intrusion signal by a door-opening sensor.

FIG. 12 is a flowchart of method for detecting and registering a container intrusion signal by a microphone.

FIG. 13 is a flowchart of method for detecting and registering a container intrusion signal by a UMPR.

FIG. 14 is a schematic diagram illustrating exemplary parameters for measuring a digital signature.

FIG. 15 show a cross-sectional view of one exemplary Mass-tomograph in accordance with one embodiment.

FIG. 16 shows a cross-sectional view of the Mass-tomograph depicted in FIG. 15 when the container is steady.

FIG. 17 shows a cross-sectional view of the Mass-tomograph depicted in FIG. 15 when the container is moving.

FIG. 18 shows a block diagram of one exemplary bridge.

FIG. 19 shows a block diagram of the bridge, depicted in FIG. 18, when stationary.

FIG. 20 shows a block diagram of one exemplary portative bridge depicted in FIG. 18.

FIG. 21 shows a block diagram of one exemplary service bridge depicted in FIG. 18.

FIG. 22 shows a diagramed depiction of one exemplary Network Operations Center depicted in FIG. 1.

FIG. 23 shows a diagramed depiction of one exemplary NOC server depicted in FIG. 22.

FIG. 24 shows a flowchart showing one exemplary method for monitoring container integrity.

FIG. 25 shows a diagramed depiction of personal conditions monitoring system.

DETAILED DESCRIPTION

Figure 1:
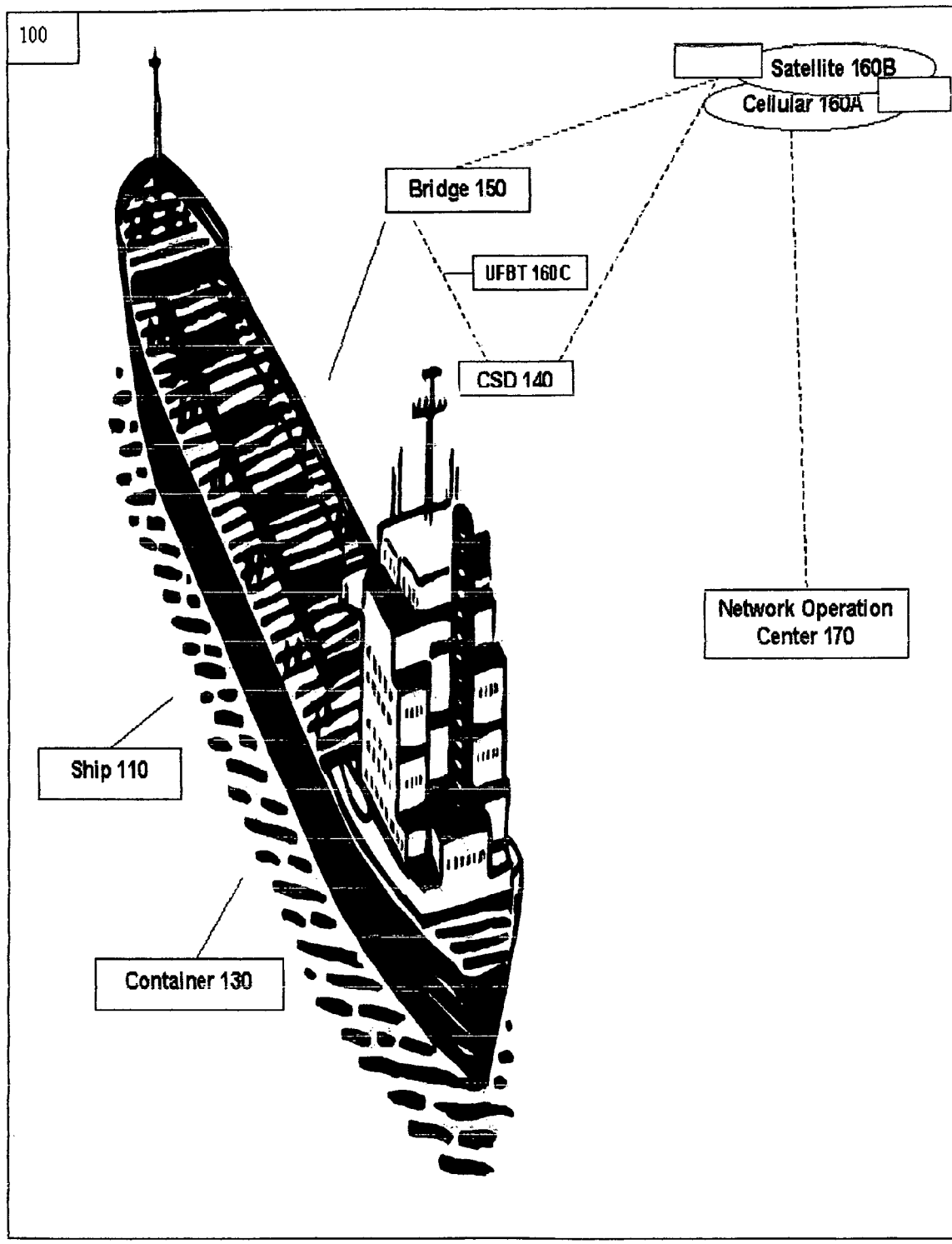
FIG. 1 shows one exemplary transportation security system in accordance with one embodiment.

FIG. 1 shows one exemplary transportation security system 100 in accordance with one embodiment. Each mode of transportation (e.g., transportation by ship) is monitored and tracked using transportation security system 100. A ship 110 is illustratively shown carrying a plurality of shipping containers 130. Each shipping container 130 has a Container Security Device ("CSD") 140 that communicates with a Network Operations Center ("NOC") 170, preferably via a Bridge 150. When the CSD 140 detects a break-in violation, an alert status is generated and transmitted to NOC 170, via the Bridge 150. The CSD 140 communicates with the Bridge 150 using an Unlicensed International Frequency Band Local Area Communication Network 160C. However, if the CSD 140 unable to communicate with the NOC 170 through the Bridge 150, the CSD 140 may communicate with the NOC 170 via a cellular communications channel 160A or a satellite communication channel 160B. The alert status generated by the CSD 140, when onboard a ship for example, includes the identity of the container 130, in which also is located, the location of the ship 110, the time and date of the alert status generation, and a description of the alert status. The NOC 170, upon receipt of the alert status, may either confirm or reject the alert status. If the alert status is confirmed, the NOC 170 may generate an alarm signal.

Figure 2:
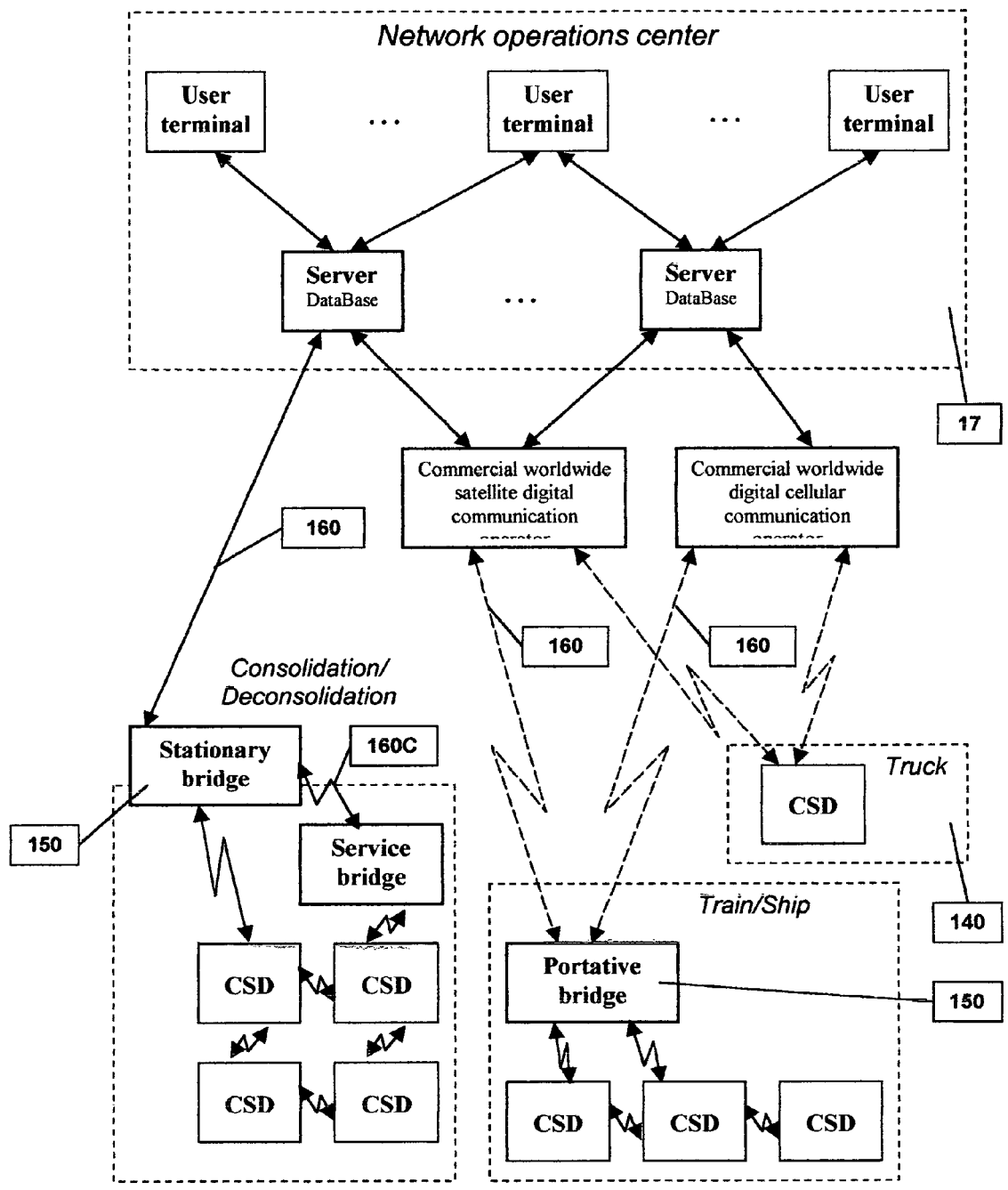
FIG. 2 is a block diagram of the transportation security system depicted in FIG. 1.

FIG. 2 is a block diagram further illustrating the transportation security system 100 of FIG. 1. In particular, FIG. 2 illustratively shows communication between CSD 140, NOC 170 and Bridge 150 in further detail. In this example, the CSD 140 is shown communicating with the NOC 170 via cellular 160A or satellite 160B communications. The Bridge 150 is also shown communicate with the NOC 170 via cellular 160A or satellite 160B connection. The Bridge 150 may also communicate with the NOC 170 via an Ethernet connection 160D, for example.

Figure 3:
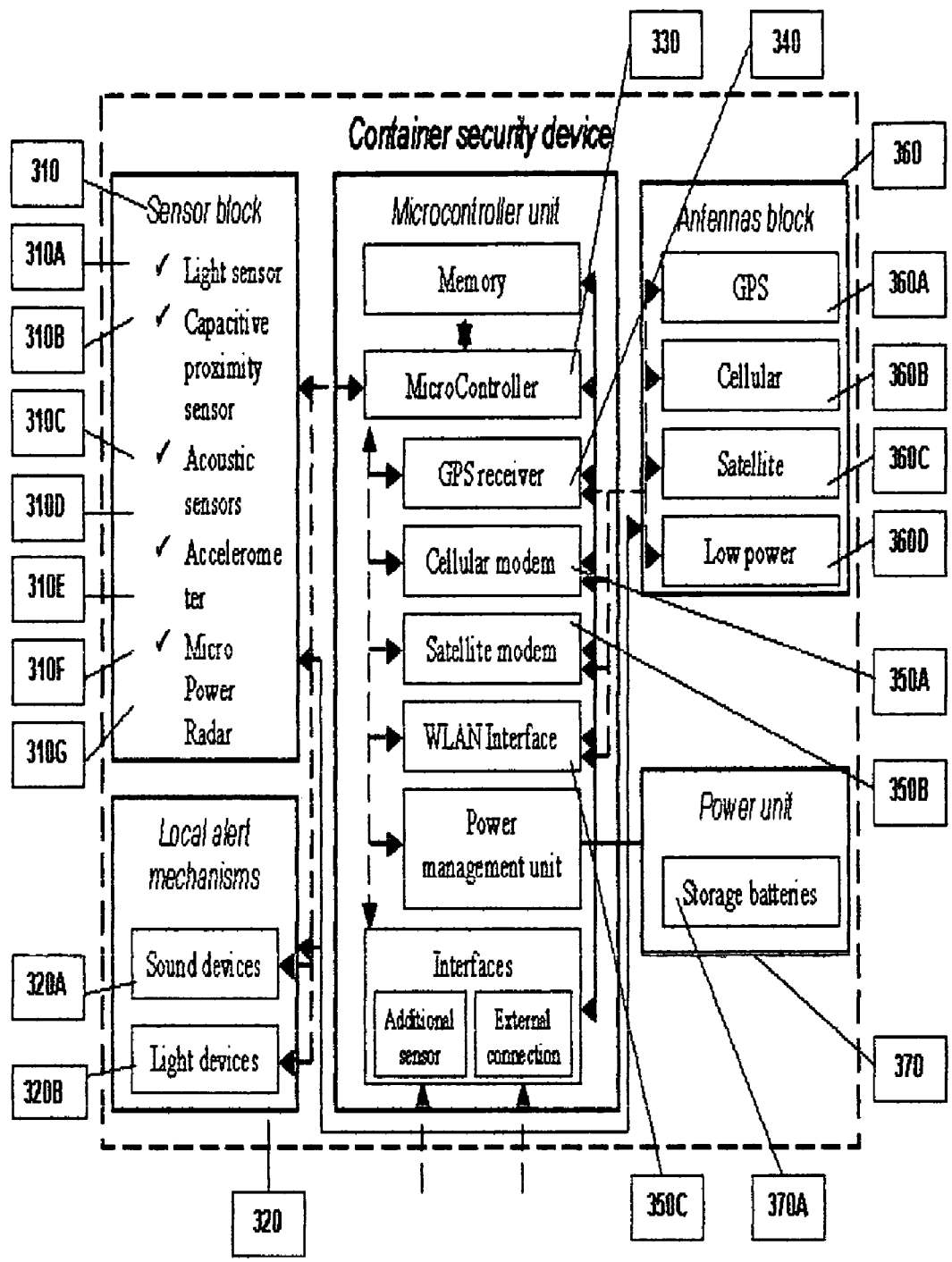
FIG. 3 is a block diagram of a Container Security Device (CSD).

FIG. 3 is a block diagram illustrates one exemplary CSD 300. CSD 300 may, for example, represent CSD 140 of FIG. 1. The CSD 300 includes a Sensor Block 310, a local alert mechanism 320, a Microcontroller 330, a GPS receiver 340, a Cellular Modem 350A, a Satellite Modem 350B, a wireless LAN (WLAN) Interface 350C, an Antenna Block 360 and a Power Unit 370. The WLAN Interface 350C uses one of the standard type Unlicensed International Frequency transceiver like Bluetooth Zigbee etc.

The Sensor Block 310 is illustratively shown with a Light Sensor 310A, a Capacity Proximity Sensor 310B, an Accelerometer 310C, a Micro Power Radar (MPR) 310D, an Inductive Sensor 310E, a RFID reader 310F, a Strain Gage 310G. The Sensor Block 310 may also include one or more of: a Piezosensor 310H, an Ultrasonic Sensor 310I, a Microphone 310P, an Ultrasound Micropower Radar (UMPR) 310J, an Infrared Sensor 310K, a Door Opening Sensor 310L, a Seal Break Sensor 310M, a Sensor control parameters of surrounding 310N, as shown in FIG. 4. Sensor control parameters of surroundings 310N may include one or more of: a Temperature Sensor, a Smoke Detector Sensor, a Humidity Sensor, etc. The Antenna block 360 includes a GPS antenna 360A, a Cellular antenna 360B, a Satellite antenna 360C, and a low power LAN antenna 360D.

In one example of operation, microcontroller 330 monitors output of sensor block 310 to determine an alert status. If an alert status is determined, microcontroller 330 may provide Cellular modem 350A, Satellite modem 350B and/or LAN interface 350C with a formatted message packet. This message packet may, for example, be transmitted from the Antenna block 360 to either the Bridge 150 or the NOC 170. Transmission message packets from the Bridge 150 and/or the NOC 170 (see FIG. 1 and FIG. 2) are received by the Antenna block 360 and directed to one or more of the Cellular modem 350A, the Satellite modem 350B and the LAN interface 350C. Microcontroller 330 may then process the Bridge 150 and/or the NOC 170 message packet to receive information and/or instructions from the NOC 170, for example.

FIG. 4 is a flowchart illustrating one exemplary method 399 for detecting and registering container intrusion signals (e.g., alert statuses). Accelerometer 310C, Piezosensor 310H and Ultrasonic sensor 310I, Microphone 310P output signals are monitored by the microcontroller 330, which thus identifies sensors 310 that exceed one or more pre-set threshold levels.

Once the container 130 is loaded with its payload, the microcontroller 330 operates in a calibration mode. The container's 130 walls may be struck several time and 'images' of these hits may be recorded and stored in a pulling library of images 425 in the microcontroller 330 for use as calibration images pertaining to this particular container 130. In one example, one or more exemplary images of intrusion or damage to the container 130 may also be stored in the library of images 425.

The microcontroller 330 identifies signals that exceed certain threshold levels. These signals may be separated by microcontroller 330, in Step 400, into a single hit signal 405 and/or a series of hit signals 407. Within the microcontroller 330, a Short Time Fast Fourier Analysis is used to process the single hit signal 405, in Step 410, and a Wavelet analysis may also be performed, in Step 415. An image of the single hit signal is then created. Correlation Functions in Step 420 and Theory of Sample Recognition in Step 430, are utilized to compare the hit image to the exemplary images stored within the library of images 425. If the microcontroller 330 determines that the single hit image correlates with to the images of intrusion into a damaged container, a majority voting algorithm is applied to the single hit image. The majority voting algorithm is a part of an integrated sensor processing procedure 470.

The majority voting algorithm is based on major voting mark of unrelated criteria. Each criteria may be assigned positive and/or negative points. When the majority voting algorithm is applied to the image of the single hit signal the decision about intrusion attempt is based on voting process based on sum of all points given during processing of the hit signal image. If the sum of total points given to the hit signal image indicates that an intrusion attempt took place, the single hit image is further subjected to the integrated sensor processing procedure 470, which makes a decision as to if intrusion occurred.

The majority voting algorithm may also be applied to the series of hit signals 407 in Step 470. If the sum of total points given during processing of the series of hit signals 407 indicates that intrusion, or even an intrusion attempt, occurred, the series of hit signals 407 are subjected to an integrated sensor processing procedure 470 which makes a decision as to if the intrusion occurred.

If the data processed by integrated sensor processing procedure 470 is incomplete or inconsistent, this data is sent by the CSD 140 to the NOC 170 for a further analysis. In this case the NOC 170 (i.e., not the CSD 140) will make the decision as to if intrusion occurred.

The microcontroller 330 may also utilize correlation functions 420 to compare output from the Accelerometer 310C and other sensors like the Piezosensor 310H and/or the Ultrasonic sensor 310I to an exemplary image that corresponds to a signal generating by a metal cutting instrument, for example, stored in the library of images 425. If, in Step 420, the microcontroller 330 determines that the intrusion signal 420 correlates to the stored signal image generated by a metal cutting instrument 425, the intrusion signal is then further subjected to an integrated sensor processing procedure 470 that makes a decision as to if the intrusion took place.

Output signals from the accelerometer 310C may also be monitored by microcontroller 330 to detect vibration of the container wall. Once a vibration signal 402 of the container wall is detected by the microcontroller 330, the microcontroller 330 may process, in step 403, the vibration signal 402 to produce a wavelet analysis and a "window" Fourier analysis for comparison, in step 440, to one or more recorded images of library of images 425 to determine which mode of transportation is used to move the container 130. The integrated sensor processing procedure 470 may then be applied to these signals to determine the mode of transport or if an intrusion took place.

An output signal from the light sensor's 310A may be monitored by the microcontroller 330 to determine intrusion or fire. For example, if the microcontroller 330 determines that the output signal indicates that the measured light within the container exceeds a certain rate of change threshold, the microcontroller 330 may initiate further analysis of the output signal, and/or other sensor signals, to determine if an intrusion is occurring, and/or if there is presence of smoke. If the microcontroller 330 determines that an intrusion has occurred and/or smoke is present, the output signal may be subjected to further processing by the integrated sensor procedure 470 to make the decision that intrusion occurred or not.

Output signals from the capacitive proximity sensor's 310B, Strain gage 310G and RFID reader 310F outputs also may be monitored by the microcontroller 330 to detect addition or removal of objects from the container 130. The output signals may, for example, be analyzed by the microcontroller 330, Step 445, to detect change in the cargo mass. If change in cargo mass is detected, the capacitive proximity sensor output may be subjected to the integrated sensor processing procedure 470 which makes a decision about the alert status of the container 130.

An output signal from the capacitive proximity's sensor 310B may be monitored by the microcontroller 330 to determine if any objects are in close proximity to locks and seals of the container 130. If any objects are detected in close proximity to the locks and the seals of the container 130, the output signals from one or more sensors may be further analyzed within the microcontroller 330 to determine if a break-in has occurred. If a break-in is detected by the microcontroller 330, further analysis of these signals may be made by the integrated sensor processing procedure 470 to make a decision as to if an intrusion occurred.

Output signals from sensors are monitored by the microcontroller 330 in control parameters of surrounding 310N. These sensors may, for example, include a temperature sensor that produces an output signal which may be monitored by the microcontroller 330 to detect thermal excursions outside one or more predetermined temperature ranges and/or to detect rates of change in temperature that occur outside one or more predefined rates of change. If, for example, the microcontroller 330 determines that the sensed temperature is outside predetermined temperature ranges and/or that the rate of temperature change if outside these predetermined limits, output signals from one or more sensors will be further analyzed by the integrated sensor procedure 470 to decide if an intrusion occurred.

In another example, an output signal from the smoke detector sensor may be monitored to determine if chemicals are present within the air, and/or air clarity inside the container 130 exceeds a predefined threshold level. If, for example, a chemical is detected within the air, output signals from one or more sensors will be further analyzed by the integrated sensor processing procedure 470 to make decision as to the container 130 alert status.

In another example, an output signal from the UMPR 310J may be monitored by the microcontroller 330 to detect presence of humans or animals within the container 130. If, for example, presence of humans and/or animals is detected, the output signals from one or more sensors may be further processed by the integrated sensor procedure 470 to make a decision as to if an intrusion occurred. The UMPR 310J may, for example, utilize the Doppler's effect to detect movement inside the container 130. The UMPR 310J may, for example include an ultrasonic transceiver. This sensor may also be used to detect force entry attempts into the container 130, based upon registration of impact drilling, gas cutting, etc., by utilization of the UMPR 310J as a highly sensitive UMPR-based microphone. The later purpose is accomplished by applying a procedure to determine, in Step 460, the integrity of the container's wall. If the UMPR 310J output data exceeds the threshold determined in Steps 460 and 465, application of a procedure to determines the integrity of the walls and the cargo movement inside the container 130 may be applied. The output data of one or more sensors may then be further analyzed within the microcontroller 330 for presence of humans/animals or presence of wall integrity failure. If, for example, presence of humans/animals and/or wall destruction are detected, the output signals from one or more sensors 310 are subjected to the integrated sensor procedure 470 to make a decision as to if an intrusion occurred.

Output signals from sensor MPR 310D may be processed to produce a radioprint (e.g., radio-imprint) based upon locations of the objects inside the container 130. The process of development of devices of radio-imprint described in the Appendixes A. This radioprint may be monitored by microcontroller 330 to detect deviations in object location, by comparing the radioprint to an initial radio print recorded during calibration, for example. Radioprints are build based on the analysis of all reflected signals, including signals reflected by objects that are not located in the direct field of the sensor. If, for example, microcontroller 330 detects deviation between a current radioprint and the radioprint recorded during calibration, the radioprints and output signals from other sensors may be subjected to the integrated sensor processing procedure 470 to determine if an intrusion occurred.

Output signals from the infrared sensor's 310K may be monitored by the microcontroller 330 to detect warm objects within the container. If, for example, the microcontroller 330 detects a warm object, the output signal from one or more sensors may be further analyzed, in Step 465, within the microcontroller 330 to determine the presence of humans or animals by applying procedures that determines movement inside the container 130. If, for example, humans or animals are detected, output signals from one or more sensors may be subjected to the integrated procedure 470 to make a decision as to if an intrusion occurred.

An output signal from the GPS receiver 340 may be monitored to determine a location of the CSD 140, and further to determine if this location differs from a programmed route for the container 130. If, for example, the microcontroller 330 determines that the current location differs from the programmed route, the output signal may be further analyzed, in Step 435, to determine deviation from the programmed route. If, for example, significant deviation from the programmed route is detected, the output signals from one or more sensors may be subjected to the integrated sensor processing procedure 470 to make a decision as to if an intrusion occurred.

In another example, the door opening sensor 310L and the seal break sensor 310M are monitored by the microcontroller 330 to detect changes in integrity of the doors and seals of the container 130. If the microcontroller 330 detects changes in integrity, the output signals from one or more sensors may be subjected to the integrated sensor processing procedure 470 to make a decision as to if an intrusion occurred.

Considering the workload and low performance of standalone CSD microprocessor stemming from strict limitations to its power consumption, a simple accelerometer signal analysis algorithm could often be employed to determine impacts against the structure of secured container.

FIG. 5 illustrates a flowchart of method for detecting and registering a container intrusion signal by accelerometer. In order to save CSD power, accelerometer indications are monitored in two modes: Standby and Active. In Standby mode, accelerometers are being checked in equal time periods, with frequency F1 about 100 Hz in, instead of constant monitoring. Sensors go offline between checkpoints, and module's microcontroller, if not being used, enters sleep mode.

In Standby, the accelerometer's 310C indications are read in time intervals dT=1/F1 in Step 501. Then the accelerometer 310C is turned on and the microcontroller 330 is in Active mode in Step 502. Then the accelerometer's values are taken in Step 503. In Step 504 the accelerometer 310C is turned off. Based on values obtained, an absolute value of apparent acceleration vector $A=\sqrt{A_X^2+A_Y^2+A_Z^2}$ and its deviation from gravity vector D=A−1 are determined in Step 505. If D does not exceed preset threshold P1 shown in Step 506, the CSD 140 remains in Standby show in Step 507, otherwise it enters Active mode of accelerometer indications monitoring. P1 should be ~0.5 g.

In Active mode, accelerometers remain online from the moment of mode entry show in Step 508 to the moment when D remains below P1 threshold shown in Step 513 for N measurement cycles as show in Steps 514 and 515, when S (number of cycle when D less then P1) exceeds N, then this in itself is the condition for exiting the Active mode as shown in Step 516, then accelerometers 301C are turned off. D is measured and determined in each measurement cycle shown in Step 510 and Step 511 and its maximum value maxD is recorded as shown in Step 509. MaxD is verified upon exiting the Active mode. If the value MaxD exceeds P2 threshold as shown in Step 517, the majority algorithm of the integrated sensor processing procedure 470 indicates an impact against container's structure and time and amplitude of hit have fixed value as shown in Step 518. If, however, the value MaxD does not exceed the threshold P2 microcontroller returns into the Standby mode as shown in Step 519.

FIG. 6 illustrates a flowchart of method for detecting and registering a container intrusion signal by a light sensor. The algorithm is used to determine breaking in the container by changed light intensity inside the container as the result of both penetration of outside light and light flashes occurring in metal cutting tools operation.

The light sensor's 310A indications are read and analyzed with frequency about 3 Hz as show in Step 601. Sampled sensor signal A is filtered out and errors due to random deviations of sensor indications are eliminated as shown in Step 602. Filtered signal $A^F$ is compared in two stages with original sensor readings A*. If $A^F$ exceeds A* by more than 2% as show in Step 603, the integrated sensor procedure 470 reports potential breaking in the container as show in Step 609. If $A^F$ exceeds A* by more than 5% as shown in Step 604, the integrated sensor procedure 470 reports the break in the container 130 as shown in Step 605. However, if $A^F$ does not exceed A* by more than 5% as shown in Step 604 the integrated sensor processing procedure 470 reports high chance of breaking in the container as show in Step 609. Light sensor is recalibrated every 15 minutes in the process of its monitoring as show in Steps 606, 607, 608 and 610. Recalibration is required because containers are not hermetically sealed, due to which light intensity inside of them could change in changing outside light conditions (at day/night).

FIG. 7 illustrates a flowchart of method for detecting and registering a container intrusion signal by a strain gage. The algorithm is used to record damage (alterations) to container structure.

The strain gage 310G is queued with frequency about 1 kHz in 15 ms long sessions shown in Step 701. Vector of measured results $A_{<15>}$ is median filtered as shown in Step 702. Measurement sessions occur with frequency about 3 Hz. Filtered signal $A^F$ is compared in two stages with original sensor readings A*. If $A^F$ exceeds A* by more than 1% as show in Step 703, the integrated sensor processing procedure 470 reports potential damage to container structure as shown in Step 707. If $A^F$ exceeds A* by more than 3% as shown in Step 704, the integrated sensor processing procedure 470 reports the break in the container 130 as shown in Step 708. However, if $A^F$ doe not exceed A* by more than 3% as shown in Step 704, the integrated sensor processing procedure 470 reports potential damage to container structure as shown in Step 707. Strain gage is recalibrated hourly in the process of its monitoring as shown in Steps 705, 706, 709 and 710. This is required because changing ambient temperature (at day/night) causes strain of metal container walls.

FIG. 8 illustrates a flowchart of method for detecting and registering a container intrusion by s smoke detector sensor. The algorithm is used to determine smoke content in the container due to fire or breaking in using metal cutting instruments.

The smoke detector sensor's 310N indications are read and analyzed with frequency about 0.1 Hz shown in Step 801. Sampled sensor signal A is filtered out and errors due to random deviations of sensor indications are eliminated shown in Step 802. Filtered signal $A^F$ is compared in two stages with original sensor readings A*. If $A^F$ exceeds A* by more than 3% shown in Step 803, the integrated sensor processing procedure 470 reports potential smoke content inside the container shown in Step 805. If $A^F$ exceeds A* by more than 10%, the integrated sensor processing procedure reports smoke content inside the container shown in Step 806. However, if $A^F$ does not exceed A* by more than 10%, the integrated sensor processing procedure 470 reports potential smoke content inside the container shown in Step 805. The some detector sensor 310N is calibrated once during activation of security module.

FIG. 9 illustrates a flowchart of method for detecting and registering a container intrusion signal by a humidity sensor. The algorithm is used to record relative humidity inside the container.

The humidity sensor's 310N indications are read and analyzed with frequency about 0.1 Hz as shown in Step 901. Sampled sensor signal is filtered out and errors due to random deviations of sensor indications are eliminated shown in Step 902. Filtered signal passes two-stage evaluation. If relative humidity exceeds 85% as shown in Step 903, the integrated sensor processing procedure 470 reports increased humidity inside the container shown in Step 906. If relative humidity exceeds 95% as shown in Step 904, the integrated sensor processing procedure reports high humidity inside the container as shown in Step 905. However, if relative humidity does not exceed 95% as shown in Step 904, the integrated sensor processing procedure 470 reports increased humidity inside the container shown in Step 906.

FIG. 10 illustrates a flowchart of method for detecting and registering a container intrusion signal by a temperature sensor. Aside from recording the temperature inside the container in order to manage cargo storage conditions, the algorithm is able to monitor the rate of temperature change.

The temperature sensor's 310N indications are read and analyzed with frequency about 0.3 Hz as shown in Step 1001. Sampled sensor signal A is filtered out and errors due to random deviations of sensor indications are eliminated as shown in Step 1002. Filtered signal $A^F$ is compared in two stages with original sensor readings A*. If $A^F$ exceeds A* by more than 2° C. shown in Step 1003, the integrated sensor processing procedure 470 reports temperature change inside the containers shown in Step 1007. If $A^F$ exceeds A* by more than 5° C. as shown in Step 1006, the integrated signal processing procedure 470 reports drastic change of temperature inside the container shown in Step 1009. However, if $A^F$ does not exceed A* by more than 5° C. as shown in Step 1006, the integrated sensor processing procedure 470 reports temperature change inside the containers shown in Step 1007. Temperature sensor is recalibrated every 15 minutes in the process of its monitoring shown in Steps 1004, 1005, 1008 and 1110. Recalibration is required because containers heat up and cool down in a broad temperature range during day/night cycle.

FIG. 11 illustrates a flowchart of method for detecting and registering a container intrusion signal by an incremental door opening sensors. In order to obtain more reliable judgment, two sensors are installed per container door.

The door opening sensors 310L are queued with frequency 0.3 Hz. In order to eliminate random errors, each sensor is queued thrice as shown in Step 1101, after which each sensor's condition is determined using majorization as part of the integrated sensor processing procedure 470 as shown in Step 1102. Based on obtained values, a judgment is drawn about condition of each container door as shown in Step 1103. If both sensors indicate closed door as shown in Step 1104, the door is reported to be closed. If both sensors indicate opened door as shown in Step 1104, the door is reported to be opened as shown in Step 1106. If sensor indications are inconsistent, sensor signal processing procedure reports potential opening of the door as shown in Step 1105.

FIG. 12 illustrates a flowchart of method for detecting and registering a container intrusion signal by a microphone, which enables CSD to record noise caused by container breaking tools, and to determine possible type of tool.

The microphone 310P is queued in sessions in 2 second intervals. This saves CSD power while avoiding the danger of missing the noise of tools' operation. Measurement session T lasts 0.2 seconds as shown in Step 1201. At the first level of examination, amplitude of microphone signal is verified across the entire frequency band. If input signal $A_{imp}$ is below preset threshold $A_{min}$ as shown in Step 1202, subsequent signal processing is skipped until next measurement cycle as shown in Step 1201. Otherwise, power of received signal $$P_A = \frac{1}{T}\int_T A_{inp}^2 dt$$

is evaluated. If signal power exceeds preset threshold $P_A > P_{min}$, judgment is drawn about presence of noise correspondent to breaking in the container as shown in Step 1203. Second level of processing takes place then, which includes spectrum analysis of signal power in order to determine the type of tool used to break in the container as show in Step 1205. In this connection, bands exhibiting signal amplitude above preset threshold $A_{inp}^f > A_{min}^f$ are gated out across the entire frequency range. Spectrum power of sound $$P_f = \frac{1}{T\Delta F}\int_{\Delta F}\int_T A_{inp}^2 dt df$$

is calculated for gated bandwidth $\Delta F$. Through signal processing, a spectrum power array at different frequency bands S is generated. Each container-breaking tool is characterized by its own array of sound spectrum power $S_i^*$, limited from below. Tool of breaking is determined in comparing arrays S and $S_i^*$. If arrays S included in an array of sound spectrum power $S_i$ as shown in Step 1205, then breaking took place and tool of breaking is recognized as shown in Step 1207. However, if arrays S is not included in an array of sound spectrum power $S_i$ as shown in Step 1205, then breaking took place but tool of breaking is unknown as shown in Step 1206.

FIG. 13 illustrates a flowchart of method of detecting and registering a container intrusion signal based on UMR. UMPR enables to construct a unique digital imprint of container interior, representing arrangement of items within radar coverage. The imprint would change reflecting changes in arrangement of interior items.

In order to obtain the imprint, the UMPR 310J emits 2 ms long pulses in ultrasonic frequency, such as 40 kHz as shown in Step 1301. Meanwhile, the UMPR 3103 receiver stays idle. Emitted signal reflects repeatedly from container interior items and then returns to the UMPR 310J where it is received by ultrasonic receiver. Receiver goes online for 50 ms after the pulse has been sent as shown in Step 1302. Changes in amplitude of received signal for this period are the imprint of container interior.

In order to compare obtained imprint against reference one (which was obtained at the beginning of the trip and store in the pulling library of images 425), UMPR receiver signal is sampled with at least double frequency of emitted signal. Obtained set of N values $Y_{<N>}$ is compared against reference imprint $X_{<N>}$ using correlation functions as shown in Step 1303. For example, a function could be used based on supposition that actual imprint could be represented on the reference basis using correlation factors A and B and expressed as $Y_i = AX_i + B$. Correlation factors are derived from the system of equations $$A = \frac{\sum_{i=1}^{N} x_i \cdot \sum_{i=1}^{N} y_i - N \cdot \sum_{i=1}^{N} x_i \cdot y_i}{\left(\sum_{i=1}^{N} x_i\right)^2 - N \cdot \sum_{i=1}^{N} x_i^2};$$

$$B = \frac{1}{N} \cdot \left(\sum_{i=1}^{N} y_i - A \cdot \sum_{i=1}^{N} x_i\right).$$

Value of correlation function formulated using least squares method $$F = \sum_{i=1}^{N} (y_i - Ax_i - B)^2$$

is compared against the limit $F_{MAX}$, and if the limit is exceeded as shown in Step 1304, a judgment is drawn about changes in container interior as shown in Step 1305.

The accelerometers 310C, as shown in FIG. 3, are included within CSD 140 and are used to create a Digital Signature (DS) and may be used to identify location of cargo within the container. FIG. 14 is a schematic diagram illustrating exemplary parameters that may be used to form this DS. In FIG. 14, the following parameters characterizing a spatial distribution of the container 130, where M is the mass of the cargo, Rm represents the coordinates of the center of mass within the body frame, which is strictly connected with the container itself, Ix, Iy, Iz are components of the container moment of inertia, which characterize the mass distribution with respect to the center of mass.

DS is thus defined by this parameters set which may define the expected motion of the container. Changes in one or more of these measured parameters may, therefore, correspond to certain events during cargo transportation. For example, if DS has not changed, the cargo is intact. If, M and Ix, Iy, Iz are the same but Rm has changed, the cargo may not be stolen or damaged, but may have moved within the container 130 (i.e., the coordinates of the center of mass Rm change as the cargo moves within the container). It may, therefore, be necessary to check fastenings of the cargo within the container. If, for example, parameter M does not change, but parameters Ix, Iy, Iz and Rm have changed, it is probably that the cargo has not been stolen (it can be precisely determined based on the degree of the parameters change). However, it is also possible that a partial destruction of the cargo took place (e.g., damage resulting from inaccurate unloading). Change of the moment of inertia with respect to the center of mass may occur due to this destruction. If all parameters of the DS have changed, it is likely that the container has been tampered with. The determination of DS allows not only to reveal theft without opening the container, but may also provide continual monitoring of the cargo's condition.

The accelerometers 310C, as shown in FIG. 3, that are included within the CSD 140, form a Mass-tomograph 1500, as shown in FIG. 15. The plurality of accelerometers that form the Mass-tomograph are coupled to walls of the container 130. The Mass-tomograph 1500 is used to construct a spatial picture of mass distribution within the container 130. In particular, FIG. 15 shows a cross-sectional view of one exemplary Mass-tomograph 1500 in accordance with one embodiment. Mass-tomograph 1500 may, for example, be used to subtract effects of the surroundings on the accelerometers measurements. The initial calibration of accelerometers may occur without any cargo in the container. A second round of measurements may occur when an object or a cargo (e.g., cargo 1510) is placed inside the container 130. The calibration measurements of the accelerometers are subtracted from the second round of measurements to eliminate influence of the container itself, and the accelerometer measurements are thus only determined for the object 1510 mass.

FIG. 16 shows a cross-sectional view of one exemplary Mass-tomograph 1600 that is external to container 130 and when the container 130 is in steady position. In this embodiment, the Mass-tomograph is used as a device to obtain imaging of the contents of the container. In this example, the mass-tomograph 1600 monitors the whole container 130. When the container 130 is in the steady position the quality of the spatial mass distribution of the container mass depends on two parameters: the accuracy of accelerometers and the distance, laccel 1620, between adjacent accelerometers 310C that form the Mass-tomograph 1600.

FIG. 17 shows a cross-sectional view of one exemplary Mass-tomograph 1700 when the container 130 is moving. Mass-tomograph 1700 may, for example represent mass-tomograph 1600, FIG. 16. In this example, the mass-tomograph 1700 scans the container 130, as the container 130 moves gradually through the Mass-tomograph 1700; in this example the container 130 moves with a steady speed Vcont 1720. In this example, a high quality spatial mass distribution inside the container 130 may be determined, since the quality of spatial mass distribution depends only on the accuracy of accelerometers; the perceived distance laccel 1620 between adjacent accelerometers will be minimal due to the movement of the container.

When the CSD 140 determines an overall container alert signal based on the decision of the integrated sensor processing procedure 470, shown in FIG. 4, the microcontroller 330 activates one or more local alert mechanisms (e.g., sound devices 320A and/or light device 320B, as shown in FIG. 3) that generate a local alarm signal. The microcontroller 330 may also activate transceivers 350A-350C to transmit a message that includes this alert via antennas 360B-360D to the Bridge 150 and/or the NOC 170. The microcontroller 330 also determines time intervals used to activate the transceivers 350A-350C during communication with the Bridge 150 or the NOC 170. In one example, these time intervals may be determined by the NOC 170.

The CSD 140 may be coupled to the wall of the container 130 by Rare Earth Magnets, Double-Stick Tape and/or Hot-Glue.

The power unit 370 of the CSD 140, as shown in FIG. 3, may include one or more storage batteries 370A. The power unit 370 may also be configured to receive electrical power from a power source of the cargo transport vehicle. In this case, if the power source is interrupted, the power unit 370 may revert to use of the storage batteries 370A and/or Solar power, for example. In the event of a power interruption or if the storage battery charge falls below a threshold level, the CSD 140 may transmit, via antennas 360, a power interrupt alarm to the Bridge 150 and/or the NOC 170.

The microcontroller 330 may also implement power-management techniques to reduce power consumption. For example, one or more time window(s) may be specified, during initialization process or via transceivers 350A-350C, to define activation times for one or more components of CSD 140. When not operating, (i.e., when outside the specified time windows, the CSD 140 may switch into a sleep (suspend) mode to avoid unnecessary power utilization. In fact, sleep mode may account for a significant part of the life of the CSD 140; the CSD 140 may operate over several years without need of storage battery replacement. In one example of operation, the CSD 140 remains awake (i.e., does not switch to sleep mode) when communicating with the Bridge 150 and/or the NOC 170. If the CSD 140 does not receive a signal from the Bridge 150 or the NOC 170, the CSD 140 will only stay awake as long as necessary to insure that no signal is present during a time windows specified. The CSD 140 may also switch from sleep to awake mode if any one anti-tamper sensor of block 310 exceeds a certain threshold level.

FIG. 18 shows a block diagram illustrating one exemplary Bridge 1800. Bridge 1800 may, for example, represent bridge 150 of FIG. 1. The Bridge 1800 includes a Microcontroller unit 1810, GPS receiver 1830, Cellular Modem 1840A, Satellite Modem 1840B, WLAN Interface 1840C, Ethernet interface 1850A, User interface 1850B, External connection interface 1850C, Antennas Block 1860 and Power Unit 1870. The block of Antennas 1860 includes GPS antenna 1860A, Cellular antenna 1860B, Satellite antenna 1860C, and International Frequency Band Local Area Communication antenna 1860D. The Cellular modem 1840A is utilized to communicate with the NOC 170 via cellular communication channel 160A, for example. The Satellite modem 1840B is utilized to communicate with the NOC 170 via satellite communication channel 160B, for example. The WLAN interface 1840C is utilized to communicate with the CSD 140 via LAN 160C. The CSD 140 communicates to the NOC 170 via the Bridge 1800. Communication from the CSD 140 to the NOC 170 is less costly when the Bridge 1800 is utilized to relay the communication. In one example, it saves energy compare to when the CSD communicates with the NOC 170 directly via cellular or satellite communications channels. In one example, the CSD 140 transmits the system status, including any alert status, to the Bridge 1800 upon request of the NOC 170.

The Bridge's 1800 includes a power unit 1870 which may receive power from a power network 1870B. In the event that this power network 1870B is interrupted, power unit 1870 may be configured to switch over to utilize Storage batteries 1870A. This power interruption may be detected by the microcontroller unit 1810, for example, which may transmit an alarm message to the NOC 170. The alarm message may, for example, identify the bridge 1800 by an identification code, the location of the ship provided by the GPS receiver 1830, the date and time of the alarm, and further description of the alarm event (e.g., loss of ship's power).

FIG. 19 shows a block diagram of one exemplary Stationary Bridge 1900 according to one embodiment. The Stationary Bridge 1900 may be placed in the areas of high container concentration, such as places of consolidation/deconsolidation of containers, ports, terminals, etc. Stationary Bridge 1900 may be used for continuous communication with the NOC 170. Stationary Bridge 1900 includes the WLAN Interface 1910 and the Ethernet interface 1920. Stationary Bridge 1900 may not include a user interface. Further, since the geographical location of the Stationary Bridge 1900 remains the same, it may not require a GPS receiver.

FIG. 20 shows a block diagram of one exemplary Portative Bridge 2000 according to one embodiment. The Portative Bridge 2000 may be used where containers are transported, such as on ships, trains, etc. The Portative Bridge 2000 includes a GPS receiver 2010, a Cellular Modem 2020A, a Satellite modem 2020B, a WLAN 2020C, an External connection interface 2030 and an Antenna Block 2060. In communicating with the NOC 170, the Portative Bridge 2000 uses cellular 160A and satellite 160B communication channels. The Portative Bridge 2000 may not have a user interface.

FIG. 21 shows a block diagram of one exemplary Service Bridge 2100 according to one embodiment. The Service Bridge 2100 may be used to support and communicate with one or more CSDs 140. The Service Bridge 2100 may include a cellular modem 2120A, a satellite-modem 2120B, a WLAN 2120C, a user interface 2130A, an External connection interface 2130B and an Antenna block 2160. The service Bridge 2100 may communicates with the NOC 170 via other Stationary and/or Portative Bridges (e.g., portative bridge 1100) using UBFT 160C and/or through the Cellular 160A and/or satellite 160B communication channels.

FIG. 22 shows a diagramed depiction of one exemplary NOC 2200. The NOC 2200 may, for example, represent NOC 170 of FIG. 1. The NOC 2200 may include a plurality of terminals 2210 and servers 2220 interconnected via Internet 2250. The servers 2220 may include a Data Base 2230. The data base 2230 may, for example, be used to store sensor data and may contained archives of container events received from one or more CSDs 140. The data base 2230 may also store information pertaining to the location and condition of cargo containers. The NOC 170 may use the services of a Commercial world wide digital cellular communication operator 2260A, configured to communicate with the CSD 140 and/or the Bridge 150 via the cellular communication channels 160A. The NOC 170 may also use the service of a Commercial world wide satellite digital communication operator 2260B that configured to communicate with the CSD 140 and/or the Bridge 150 via satellite communication channels 160B.

FIG. 23 illustrates a more detailed diagram of the system server 2220 and its interaction with other system elements. The server is comprised of a software complex and the database 2230. Generally, server includes following software: database, program for communication with CSD 2380, programs for communication with operator terminals 2350, and program for analysis of CSD sensor data 2370.

The database 2230 contains identification and custom data of secured objects, their condition, CSD operation parameters and commands issued to security modules by system operators. The database can also include data from CSD sensors for its further detailed examination by server means.

The CSD communication program 2380 receives CSD data during communication session established directly or via bridge, moves the data to server database, extracts operator commands and required service data from the database and sends them to modules.

The operator terminal communication program 2350 could be used for data exchange with custom terminal programs installed on user computers, or for development of web interface accessible by any authorized user from any computer without dedicated software installed. Accordingly, there can be two types of operator terminals: computer with terminal application installed 2310 and/or computer with a web browser 2330. The computer with terminal application installed 2310 has the advantage of quick data exchange. The computer with web browser 2330 provides easy access to the system. Both applications handle operator commands issuing to CSD, their saving in the database and transfer of information about secured objects from database to operator terminals.

The CSD sensor data analysis program 2370 is used when CSD software is incapable to process sensor data to the level sufficient for deciding on condition of secured object due to its limited computing performance. The CSD sensor data analysis program extracts CSD sensor data from the database, processes it and concludes about the condition of CSD and secured object. Calculation results are stored in server database 2230.

FIG. 24 shows a flowchart illustrating one exemplary method 2399 for monitoring container integrity in accordance with one embodiment. When production of the CSD 140 takes place, the CSD 140 gets initiated in step 2400. The initiation step 2400 includes a data packet that is download into CSD's 140 microcontroller 330. The data packet includes certain parameters that remain unchanged during the lifetime of the CSD 140. These parameters include an identification code for the CSD 140, an address of a server that may be used to communicate with the CSD, and associated parameters of communication, etc. The initiation of the CSD 140 may, for example, be done by the Bridge 150 or other equipment (not shown).

The operation of the CSD 140 is cyclic. Each CSD cycle lasts one container trip/route (i.e., from the moment of uploading to before the unloading of the container 130). At the route start, the CSD 140 is activated by the Bridge 150 or the NOC 170. During the CSD activation, in Step 2402, the CSD's microcontroller 330 is cleared of any previously stored information. New information pertaining to the container's route and movement schedule, as well as parameters and logic that use regimes pertaining to the container's 130 safety, are downloaded into the microcontroller 330. The CSD is placed in the active mode, in Step 2402, by the Bridge 150 or by the server 2220 of the NOC 170.

During the container's route, condition of the container 130 and its cargo are continually or periodically monitored. During the container's 130 route the CSD microcontroller 330 checks for an alert status from the integrated sensor processing procedure 470 in Step 2404. Then, in Step 2406, the microcontroller 330 checks if it is a time for the packet of the information pertaining to the container's condition to be sent to the NOC 170. Then in Step 2408 the microcontroller 330 also checks if the request for communication with the NOC 170 was received from the Bridge 150. If the NOC 170 receives a message containing an alert status from the CSD 140, the NOC 170 sends a request to the CSD's 140 GPS receiver 340. In response to this request, the GPS receiver determines the geographical location of the CSD 140 in Step 2410, and sends this location information to the microcontroller 330.

The CSD 140 may also determine its geographical location by requesting location information from the bridge 150. The microcontroller 330 may also periodically request location information from either the GPS receiver 340 or the bridge 150. When the microcontroller sends the request to the GPS receiver in Step 2420, the GPS receiver 340 determines the geographical position of the container 130 in Step 2422.

In Step 2412 the CSD 140 establishes connection to the NOC 170. The CSD 140 communicates with the NOC 170 through the Bridge 150 using Unlicensed International Frequency Band Local Area Communication Network 160C. However, if the CSD 140 unable to communicate with the NOC 170 through the Bridge 150, The CSD 140 may communicate with the NOC 170 via cellular communications channels 160A or satellite communications channels 160B. The CSD's communication via the Bridge 150 may be less expensive and may also save energy, as compared to contacting the NOC 170 directly via cellular 160A or satellite 160B communication channels.

During communication, in step 2412, between the CSD 140 and the NOC 170, the CSD 140 sends the information packet to the NOC 170. This packet may include one or more of the transmission time, the channel of communication, level of batteries charge, location of the CSD etc. In response to this information the NOC 170 requests that the CSD 140 perform certain commands, in Step 2414, pertaining to further operation of the CSD 140, including a regime for monitoring containers safety, etc. I one example, the CSD 140 may receive a command from the NOC 170 to deactivate the CSD 140. In step 2416 the CSD verifies that the received command is a deactivation command and, if it is, the CSD deactivates in Step 2418; otherwise Steps 2404-2416 are performed continually until a deactivation command is received. In one example, the CSD 140 may deactivate at route completion before the cargo is unloaded. During this deactivation period, the CSD 140 ceases to monitor containers and cargo safety.

Proposed system could be employed not only for providing security to general ISO containers, but also for ensuring safety of other moving objects, such as vehicles, boats, etc., as well as of remote fixed objects, e.g. country houses. The difference in these cases is the mobile module at secured object.

FIG. 25 illustrates the diagram of one potential system application—a personal conditions monitoring system 2500. The system could be employed for monitoring health conditions and accumulated workload of physically weakened persons, those in need for constant medical supervision, as well as specialists directly engaged in potentially dangerous activities. Examples include military and special services personnel, professional drivers, athletes, alpinists, etc. Generally, security module could be used for monitoring personal conditions, accumulated physical load, for recording events occurred to the person (falling, impacts, changes of position of the body, traveling in transport, etc.), as well as for recording events in the immediate vicinity of the person (gunshots, explosions, changes of temperature and humidity, etc.).

Monitoring module, for example could be the CSD 140, which includes: the sensor array 310 and ADC 320, computing subsystem comprised of the microcontroller 330 and memory unit, communication subsystem including the transceiver 350 and the antenna 360, and power subsystem with replaceable batteries 370. The combination of sensors is determined by the purpose of the module. For most applications, the accelerometers 310C could be used as they enable to monitor position and movement of a person, his pulse and a number of events in the surroundings, and electrodes for measuring amplitude-time parameters of heart biopotentials (ECG) and electrical impedance of the body to automatically estimate functional state of cardiovascular system on the basis of data obtained in examination of electrical activity of the heart, type of vegetative regulation of the rhythm and central gemodynamic parameters obtained in automatic syndromal ECG diagnostics, heart rate variability analysis and impedance gram analysis of the body.

In its operation, monitoring module continuously monitors sensor indications, performs initial processing of measured values, concludes about the condition of the person or events occurred to him, and sends data to the server 2220. Data is sent to server if personal conditions have changed or when certain emergency events occur, and periodically, e.g. hourly. Data is transferred over a wireless Wi-Fi based link 160C or using cellular networks 160B. The server 2220 receives information from the monitoring module 140, performs its additional processing if necessary, and stores it in the database 2230. In emergency cases, server sends SMS notification to phone numbers specified for the person. Terminal program displays all data on the terminal 2310 available at the server in real-time, notifying operator in emergency if necessary.

It should be noted that the matter contained in the above description or shown in the accompanying drawings should be interpreted as illustrative and not in a limited sense. The following claims are intended to cover all generic and specific features described herein, as well as all statements of the scope of the present method and system, which, as a matter of language, might be said to fall there between.

What is claimed is:

1. A security system for monitoring at least one shipping container being transported by at least one cargo transport vehicle, the system comprising:
   a Container Security Device (CSD) configured to be removably coupled to the at least one freight shipping container wall thereby utilized for monitoring a cargo inside the container and detection of intrusion violations accompanied with partial destruction of the container wall when in a coupled condition, the CSD including at least one anti-tamper sensor, a microcontroller and a communication device;
   wherein the microcontroller generates an alert status based on an output data generated by least one anti-tamper sensor being subjected to an individual sensor processing procedure and then to an integrated sensor processing procedure, the integrated sensor processing procedure makes determination of the overall container alert status based on the output data from said at least one sensor; and
   a Network Operations Center (NOC), the NOC including a NOC communications facility configured to communicate with at least one telecommunication network, the NOC being configured to receive data from each of a plurality of the CSDs and including a data storage medium configured to store sensor data and contained an archive of the container events,
   wherein the CSD communication device is configured to communicate its condition including an alarm transmission to the NOC via satellite communication channels,
   wherein at least one anti-tamper sensor includes an accelerometer, and the accelerometer output is monitored for exceeding a pre-set threshold, which triggers the data to be further analyzed in the microcontroller for presence of an intrusion signal, and
   wherein the CSD microcontroller compares the accelerometer output to a standard signal, corresponding to a signal generated by a metal cutting instrument to determine if the metal cutting instrument is used to break the container wall.

2. A security system for monitoring at least one shipping container being transported by at least one cargo transport vehicle, the system comprising:
   a Container Security Device (CSD) configured to be removably coupled to the at least one freight shipping container wall thereby utilized for monitoring a cargo inside the container and detection of intrusion violations accompanied with partial destruction of the container wall when in a coupled condition, the CSD including at least one anti-tamper sensor, a microcontroller and a communication device;
   wherein the microcontroller generates an alert status based on an output data generated by least one anti-tamper sensor being subjected to an individual sensor processing procedure and then to an integrated sensor processing procedure, the integrated sensor processing procedure makes determination of the overall container alert status based on the output data from said at least one sensor; and
   a Network Operations Center (NOC), the NOC including a NOC communications facility configured to communicate with at least one telecommunication network, the NOC being configured to receive data from each of a plurality of the CSDs and including a data storage medium configured to store sensor data and contained an archive of the container events,
   wherein the CSD communication device is configured to communicate its condition including an alarm transmission to the NOC via satellite communication channels,
   wherein at least one anti-tamper sensor includes an accelerometer, and the accelerometer output is monitored for exceeding a pre-set threshold, which triggers the data to be further analyzed in the microcontroller for presence of an intrusion signal,
   wherein the accelerometer output is being monitored to detect a vibration signal of the container wall, and the CSD microcontroller subjects the accelerometer vibration signal to a wavelet analysis and a "window" Fourier analysis to produce a data of a current vibration, and
   wherein the CSD microcontroller compares the data of the current vibration to a standard data related to a mode of transportation to determine which mode of transportation is used to move the container.

3. A security system for monitoring at least one shipping container being transported by at least one cargo transport vehicle, the system comprising:
   a Container Security Device (CSD) configured to be removably coupled to the at least one freight shipping container wall thereby utilized for monitoring a cargo inside the container and detection of intrusion violations accompanied with partial destruction of the container wall when in a coupled condition, the CSD including at least one anti-tamper sensor, a microcontroller and a communication device;
   wherein the microcontroller generates an alert status based on an output data generated by least one anti-tamper sensor being subjected to an individual sensor processing procedure and then to an integrated sensor processing procedure, the integrated sensor processing procedure makes determination of the overall container alert status based on the output data from said at least one sensor; and
   a Network Operations Center (NOC), the NOC including a NOC communications facility configured to communicate with at least one telecommunication network, the NOC being configured to receive data from each of a plurality of the CSDs and including a data storage medium configured to store sensor data and contained an archive of the container events,
   wherein the CSD communication device is configured to communicate its condition including an alarm transmission to the NOC via satellite communication channels,
   wherein the CSD further comprises a plurality of accelerometers that form a mass-tomograph, and the mass-tomograph is used to build up a spatial picture of a mass distribution through the container,
   wherein the mass-tomograph used to obtain information about the cargo mass and the mass distribution inside the container to determine a digital signature (DS), and
   wherein the DS includes parameters including container mass (M), components of the container moment of inertia ($I_x$, $I_y$, $I_z$) and the center of mass coordinates of the body frame (Rm), said parameters characterize spatial distribution of the container mass.

4. The system of claim 3, wherein the change in the DS parameter Rm indicates that the cargo inside the container has shifted during the containers motion.

5. The system of claim 3, wherein the change in the DS parameters Ix, Iy, Iz and Rm indicates that the partial destruction took place.

6. The system of claim 3, wherein the change in the DS parameters M, Ix, Iy, Iz and Rm indicates that the container has been tampered.

7. A method for monitoring at least one freight shipping container being transported by at least one cargo transport vehicle, the method comprising:

providing a container security device (CSD) configured to be removably coupled to the at least one freight shipping container wall thereby utilizing for monitoring a cargo inside the container and detection of intrusion violations accompanied with partial destruction of container wall when in a coupled condition, the CSD including at least one anti-tamper sensor, a microcontroller, and the CSD communication device;

sending an output data obtained from the at least one anti-tamper sensor to the microcontroller;

analyzing the output sensor data according to an individual sensor processing procedure;

determining an alert status based on the step of analyzing output sensor data according to an integrated sensor processing procedure based on the analysis of the individual processing procedure; and transmitting the alert status condition to a Network Operations Center (NOC), wherein the step of transmitting is performed using a pre-existing telecommunications system, wherein the at least one anti-tamper sensor includes an accelerometer, wherein the accelerometer output is being monitored for exceeding a pre-set threshold, which triggers the output data to be further analyzed in the microcontroller for presence of an intrusion signal, and wherein step of monitoring the container CSD include monitoring parameters including M, Ix, Iy, Iz, and Rm, said parameters characterizing spatial distribution of the container mass.

* * * * *